United States Patent
Ishii et al.

[11] Patent Number: 5,890,210
[45] Date of Patent: Mar. 30, 1999

[54] MAGNETIC DISK APPARATUS AND COMMAND PROCESSING METHOD THEREOF

[75] Inventors: Shuichi Ishii; Yasuhiko Ichikawa, both of Tokyo, Japan

[73] Assignee: Kabushiki Kaisha Toshiba, Kawasaki, Japan

[21] Appl. No.: 764,862

[22] Filed: Dec. 13, 1996

[30] Foreign Application Priority Data

Jun. 28, 1996 [JP] Japan ..................................... 8-170414

[51] Int. Cl.⁶ .................................................. G06F 13/00
[52] U.S. Cl. ........................................... 711/113; 395/872
[58] Field of Search ........................... 395/872; 711/113, 711/112

[56] References Cited

U.S. PATENT DOCUMENTS

| | | | |
|---|---|---|---|
| 5,115,490 | 5/1992 | Komuro et al. ........................ | 711/202 |
| 5,317,713 | 5/1994 | Glassburn ................................ | 395/425 |
| 5,381,528 | 1/1995 | Brunelle ................................... | 395/250 |
| 5,465,338 | 11/1995 | Clay ........................................ | 395/310 |
| 5,530,673 | 6/1996 | Tobita et al. ........................ | 365/185.09 |
| 5,694,570 | 12/1997 | Beardsley et al. ....................... | 711/113 |
| 5,710,943 | 1/1998 | Burton et al. ........................... | 395/872 |
| 5,771,359 | 6/1998 | Galloway ................................. | 395/308 |
| 5,778,420 | 7/1998 | Shitara .................................... | 711/113 |

FOREIGN PATENT DOCUMENTS 4-225444  8/1992  Japan ............................... G06F 12/08

*Primary Examiner*—Tod R. Swann
*Assistant Examiner*—Chistopher S. Chow
*Attorney, Agent, or Firm*—Limbach & Limbach LLP

[57] ABSTRACT

In this invention, there is provided a magnetic disk apparatus and a command processing method of the magnetic disk apparatus in which the cache function can be effectively performed even in a case where read commands and write commands are alternately issued and the read or write command can be executed at high speed. An HDC includes a read address holding register in which an access starting address is set when a read command is issued from a host system and which holds an access address associated with the read command and a write address holding register in which an access starting address is set when a write command is issued from the host system and which holds an access address associated with the write command.

15 Claims, 21 Drawing Sheets

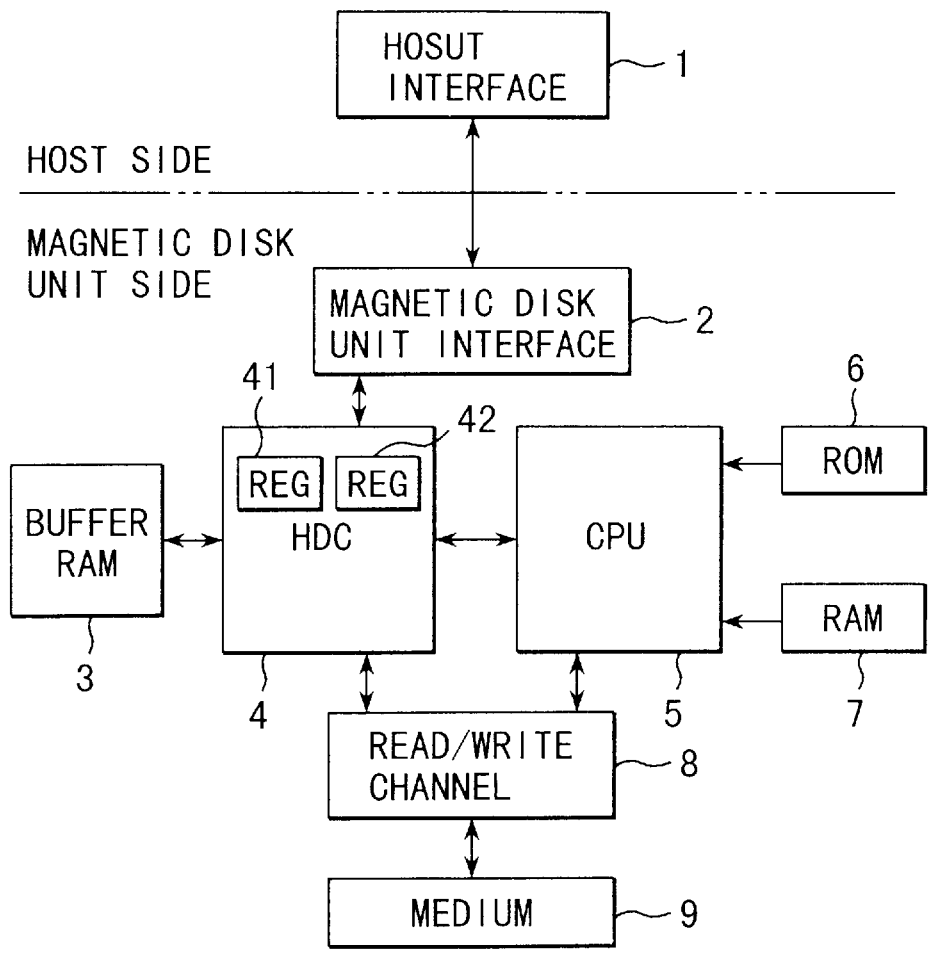
F I G. 1

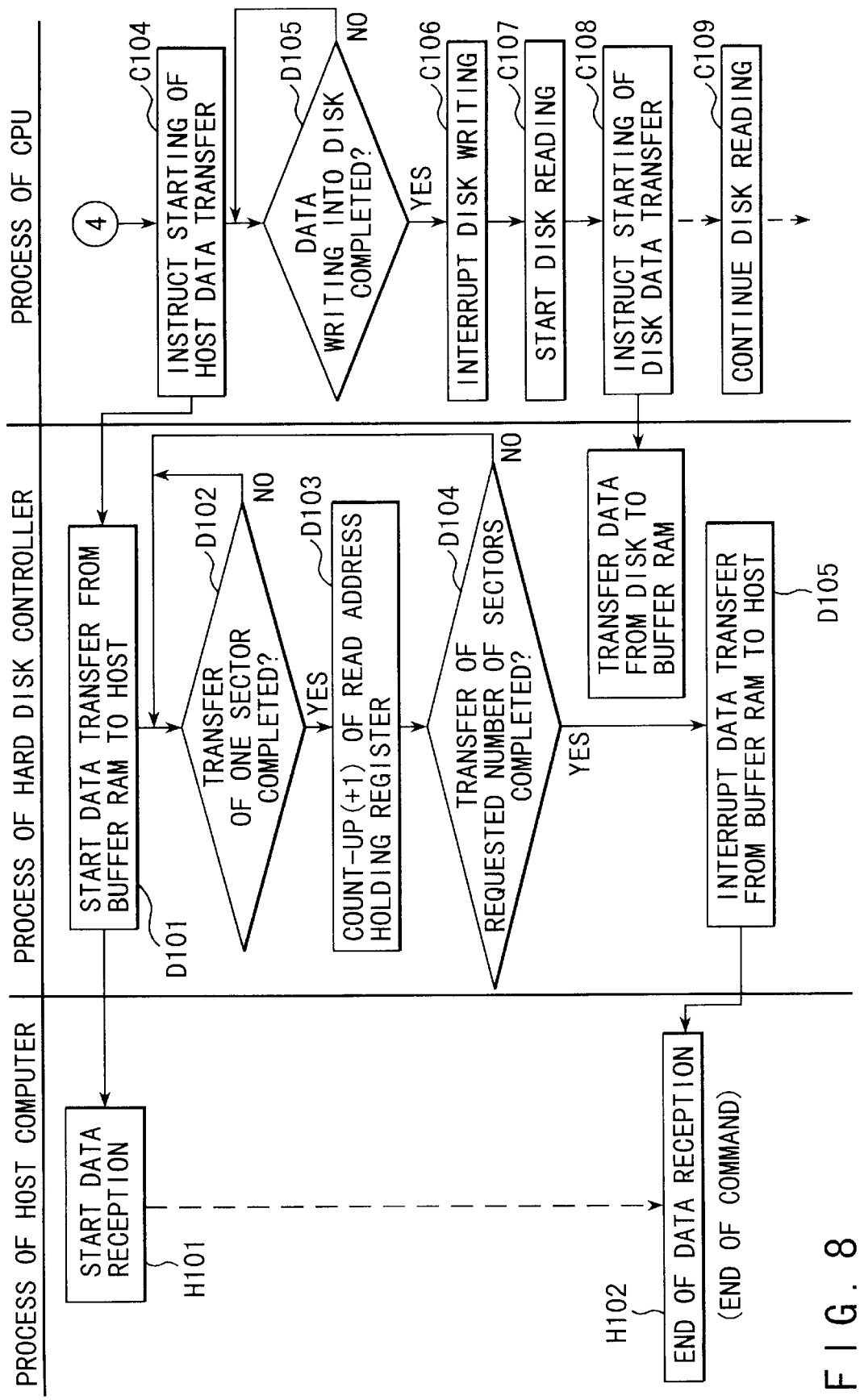
F I G. 8

MAGNETIC DISK APPARATUS AND COMMAND PROCESSING METHOD THEREOF

BACKGROUND OF THE INVENTION

1. Field of the Invention

The present invention relates to a magnetic disk apparatus having a hard disk controller (HDC) for controlling the data transfer and the processing of commands from a host system and a command processing method thereof.

2. Description of the Related Art

This type of magnetic disk apparatus which is well known in the art is widely used as an external storage device of a computer. In the magnetic disk apparatus, data recording (writing) or readout is effected by driving the magnetic head to effect the seeking operation in a radial direction of a rotating magnetic disk (which is hereinafter referred to as a medium) of a circular form.

A read command or write command for the magnetic disk apparatus is issued from a host system (computer). The issued command is supplied to a hard disk controller (HDC) in the magnetic disk apparatus. The HDC holds an access address of the command, that is, an address specified by the issued command is accessed. At the time of the end of the command, the access address is up-dated to a next sequential address value and then held.

After this, if a new different read command or write command is issued and the access address of the newly issued command coincides with the above held address, it is determined by the HDC that the access is sequential. As a result, it becomes possible to perform the automatic command execution (including data transfer) without using a firmware (FW). That is, the operation speed of command execution performed when the same commands are continuously issued for the sequential addresses can be enhanced. The above-mentioned speed enhancing method is generally referred to as a sequential cache function.

The sequential cache function is concretely explained. For example, in the read operation, a read command is first issued by the host system and the read operation for the medium is started. Data stored in the medium is read out by the read operation and stored into a buffer RAM. Then, after the operation of fetching all the target data is completed, data of the sequential addresses is continuously read out (prefetching).

Read data prefetched in response to the command issued from the host for the sequential addresses and stored in the buffer RAM can be continuously transferred. Therefore, a read command can be executed at high speed.

However, the sequential cache function in the above-described conventional disk unit has the following problems.

The address held by the HDC at the time of completion of the directly preceding command is erased when a different command is issued. That is, a new address is overwritten on the address storage area. Therefore, if a write command is executed once while a plurality of read commands are sequentially processed by the HDC, the address held at the time of completion of the final read command is erased and the write command is newly held. As a result, if the read access to the sequential addresses is executed again after completion of the write command, whether the addresses are sequential or not cannot be determined even if read data obtained by the cache operation is stored in the buffer RAM.

Therefore, the sequential cache function cannot be effectively carried out and the read operation with respect to the medium must be newly started again. Thus, a problem that the execution time for the command is greatly increased occurs.

Even when a sequence of access addresses are not completely continuous and if data is already transferred to the buffer RAM by prefetching in a case where a certain address and a next address are relatively close to each other, for example, the cache operation for the issuance of a command for an address which is not continuous is performed by using part of the data.

That is, since the automatic operation by the HDC cannot be performed in the operation of issuing a read command for the address which is not continuous, the command is executed by use of the FW. At this time, if the preceding access end address and the present access address are relatively close to each other, the command execution (data transfer) can be performed at high speed by the management of buffer RAM data by use of the FW because the data is already read out into the buffer RAM or is immediately read out after this.

Further, in a case where data read out by the execution of the read command previously performed is left in the buffer RAM and if a read command is issued to the address area again, the command execution can be immediately performed without effecting the operation of reading data from the medium.

Even in the above case, the following problem occurs. That is, as described before, if a write command is executed at least once during executions of read commands, it becomes necessary to check whether read data in the buffer RAM is changed or not. That is, whether or not the address range of data rewritten by the write command is contained in the address range of read data left in the buffer RAM is checked. However, as described before, the address held at the time of completion of a plurality of sequential write commands executed between the read commands is erased by issuance of a next read command. As a result, the address range of written data is made unclear and read data in the buffer RAM must be discarded, thereby making it impossible to efficiently perform the sequential cache. Therefore, the execution time of commands is greatly increased.

SUMMARY OF THE INVENTION

An object of this invention is to provide a magnetic disk apparatus and a command processing method of the magnetic disk apparatus in which the cache function can be effectively performed and a read command or write command can be executed at high speed even in a condition that the read commands and write commands are alternately issued in order to solve the above problems.

According to this invention, there is provided a magnetic disk apparatus having a buffer for temporarily storing information transferred between a host system and a magnetic disk according to a read command or write command from the host system and performing the cache operation with respect to the host system by using the buffer without using any control program, comprising:

a read address holding register for holding an access starting address of a read command when the read command is received from the host system, a preset value being added to the content of the read address holding register each time data of a unit amount is transferred to the host system; and a write address holding register for holding an access starting address of a write command when the write read command is received from the host system, a preset value being added to the content of the write address holding register each time data of a unit amount is received from the host system.

According to the magnetic disk apparatus of this invention, the cache operation of read commands using the read address holding means and the cache operation of write commands using the write address holding means can be independently performed.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram schematically showing the hardware structure of a first embodiment of a magnetic disk apparatus according to this invention;

FIG. 8 is a flowchart for illustrating part of the operation of the second embodiment of the magnetic disk apparatus according to this invention;

DETAILED DESCRIPTION OF THE PREFERRED EMBODIMENTS

Figure 2:
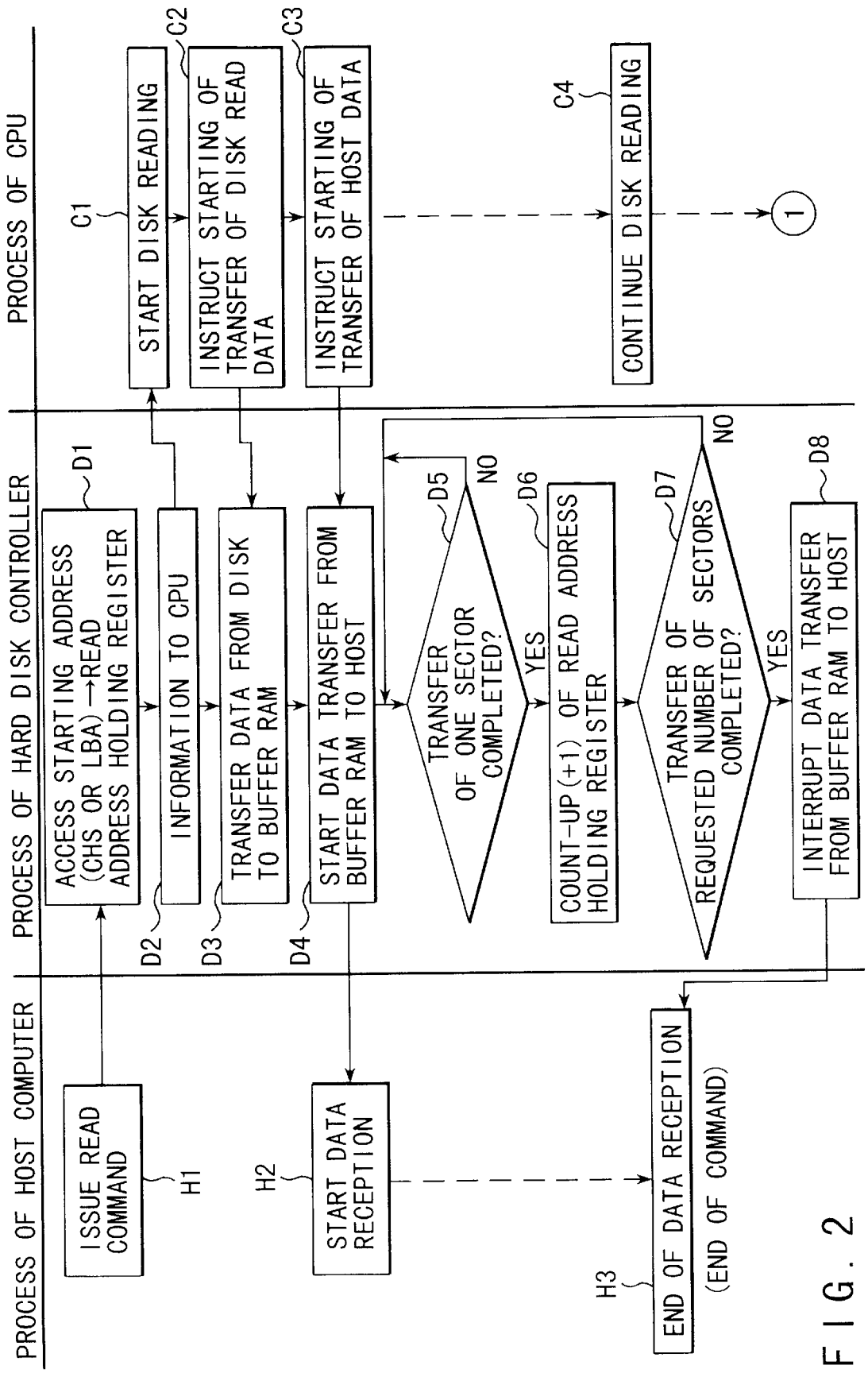
FIG. 2 is a flowchart for illustrating part of the operation of the first embodiment of the magnetic disk apparatus according to this invention.

There will now be described first to fifth embodiments of the magnetic disk apparatus according to this invention with reference to the accompanying drawings.

In the first embodiment, a magnetic disk apparatus for processing sequential read commands, then processing sequential write commands, and after this, processing a read command for an address which continues from the access address of the preceding read command is explained.

In the second embodiment, the cache operation effected in a case where the access addresses of the read commands are not completely sequential is explained.

In the third embodiment, a first modification of the structure of an address holding register used in the first or second embodiment is explained.

In the fourth embodiment, a second modification of the structure of the address holding register used in the first or second embodiment is explained.

In the fifth embodiment, a magnetic disk apparatus for processing write commands, then processing read commands, and after this, processing a write command for an address which continues from the access address of the preceding write command is explained.

(First Embodiment)

FIG. 1 is a block diagram schematically showing the hardware structure of a magnetic disk apparatus according to a first embodiment of this invention.

A reference numeral 1 denotes a host interface disposed on the host side and acting as an interface with respect to the magnetic disk apparatus. A reference numeral 2 denotes a magnetic disk apparatus interface disposed on the magnetic disk apparatus side and acting as an interface with respect to the host. A reference numeral 3 denotes a buffer RAM for temporarily holding write data from the host and read data from a medium.

A reference numeral 4 denotes a hard disk controller (HDC) for effecting the command processing/data transfer with respect to the host, data transfer with respect to a read/write channel, management of the buffer RAM, and the like. The HDC 4 has a function of receiving write data associated with a write command from the host system when the write command is issued in the host system and temporarily holding the same in the buffer RAM and a function of transmitting data temporarily held in the buffer RAM to the read/write channel. Further, it has a function of receiving data which is read out from the medium via the read/write channel when a read command is issued in the host system and temporarily holding the same in the buffer RAM and a function of transmitting data held in the buffer RAM to the host system.

In this embodiment, the HDC 4 performs the data transfer between the host system and the buffer RAM 3 by the hardware (HW) without using a control program (firmware which is referred to as FW). For some address to which the command is issued, the HDC 4 performs the command reception, data transfer, and completion of the command without using FW.

A reference numeral 5 denotes a CPU for effecting the management process for the whole magnetic disk apparatus. A reference numeral 6 denotes a ROM in which the data table, the execution program of the CPU 5 and the like are stored. A reference numeral 7 denotes a RAM which is sometimes used as a data work area at the time of execution of the firmware (FW) by the CPU 5. A reference numeral 8 denotes a read/write channel for effecting the data input/output, signal processing with respect to a medium 9.

The buffer RAM 3 temporarily stores information transferred between the medium 9 and the host system according to the read command or write command from the host system and the cache operation is performed by use of the buffer RAM 3. The HDC 4 includes a read address holding register 41 in which an access starting address for the buffer RAM 3 is set at the time of issuance of a read command from the host system and which holds the access address associated with the read command and a write address holding register 42 in which an access starting address for the buffer RAM 3 is set at the time of issuance of a write command from the host system and which holds the access address associated with the write command. The cache operation in the read command using the read address holding register 41 and the cache operation in the write command using the write address holding register 42 are independently effected.

Therefore, even in a case where the access operation is effected by issuing a write command after issuing a read command, and then issuing a read command, high-speed execution of the command can be attained without interrupting the read cache operation.

The read address holding register 41 and write address holding register 42 are not necessarily provided in the HDC 4 and may be contained in a different block.

More specifically, it is supposed that the magnetic disk apparatus of this embodiment is an IDE hard disk and the addressing from the host system is performed by use of a logical block address (LBA) or a cylinder, head, sector (CHS) used in the ATA (AT Attachment) standard. The above two types of addresses are based not on the physical hard disk but on the logical hard disk. The magnetic disk apparatus of this invention is not limited to a specified interface such as IDE (ATA) or SCSI.

Figure 3:
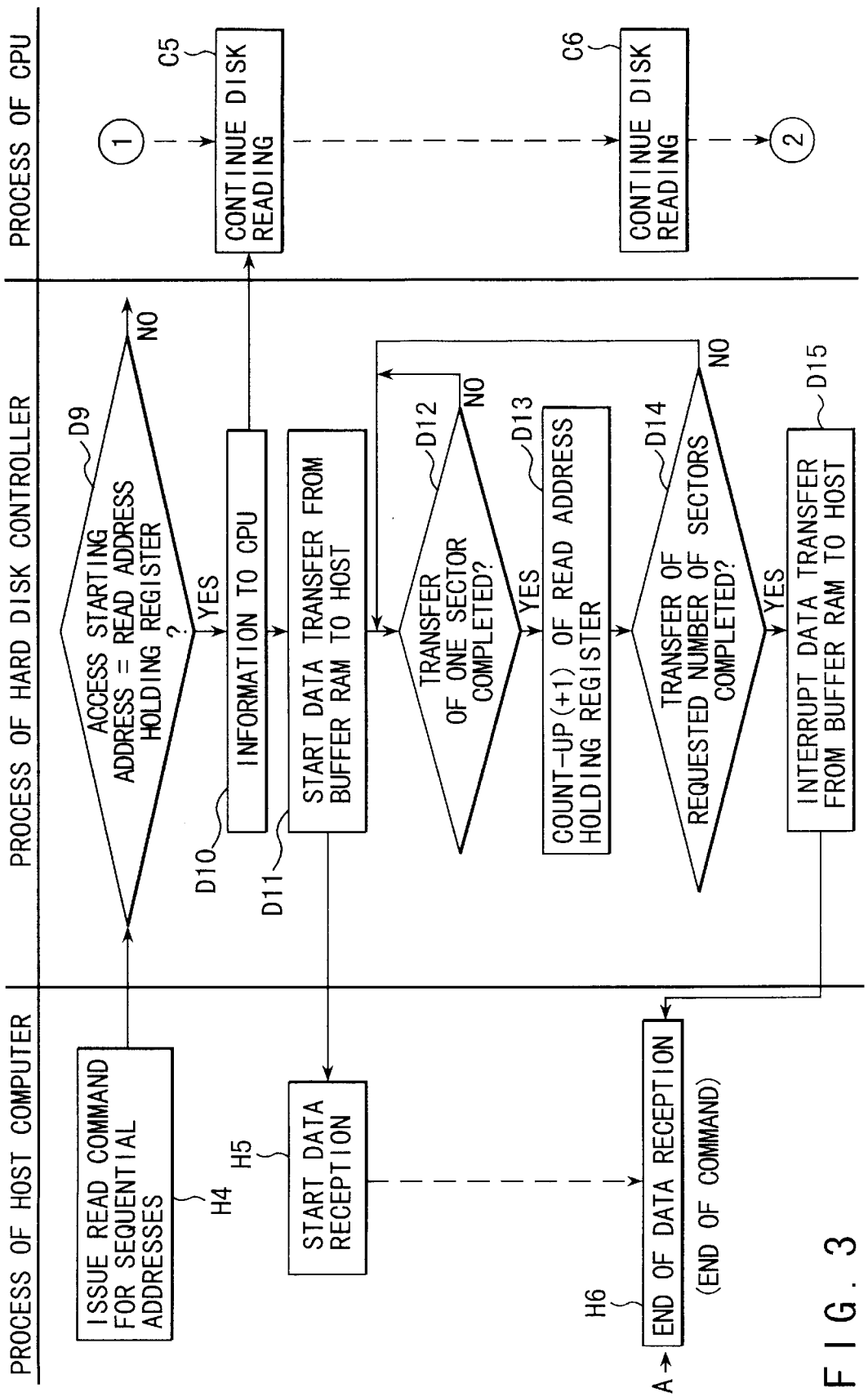
FIG. 3 is a flowchart for illustrating part of the operation of the first embodiment of the magnetic disk apparatus according to this invention.
Figure 4:
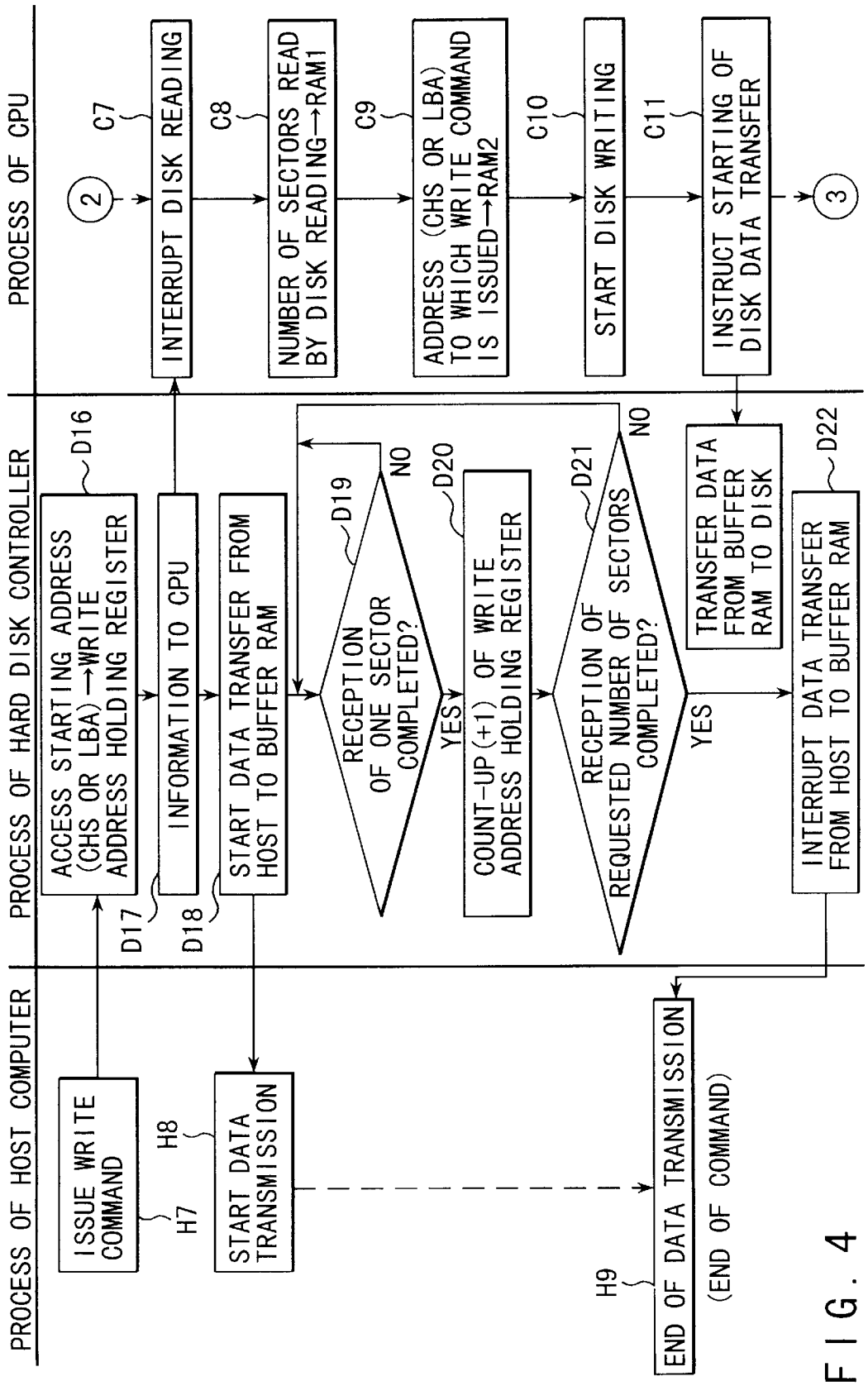
FIG. 4 is a flowchart for illustrating part of the operation of the first embodiment of the magnetic disk apparatus according to this invention.
Figure 5:
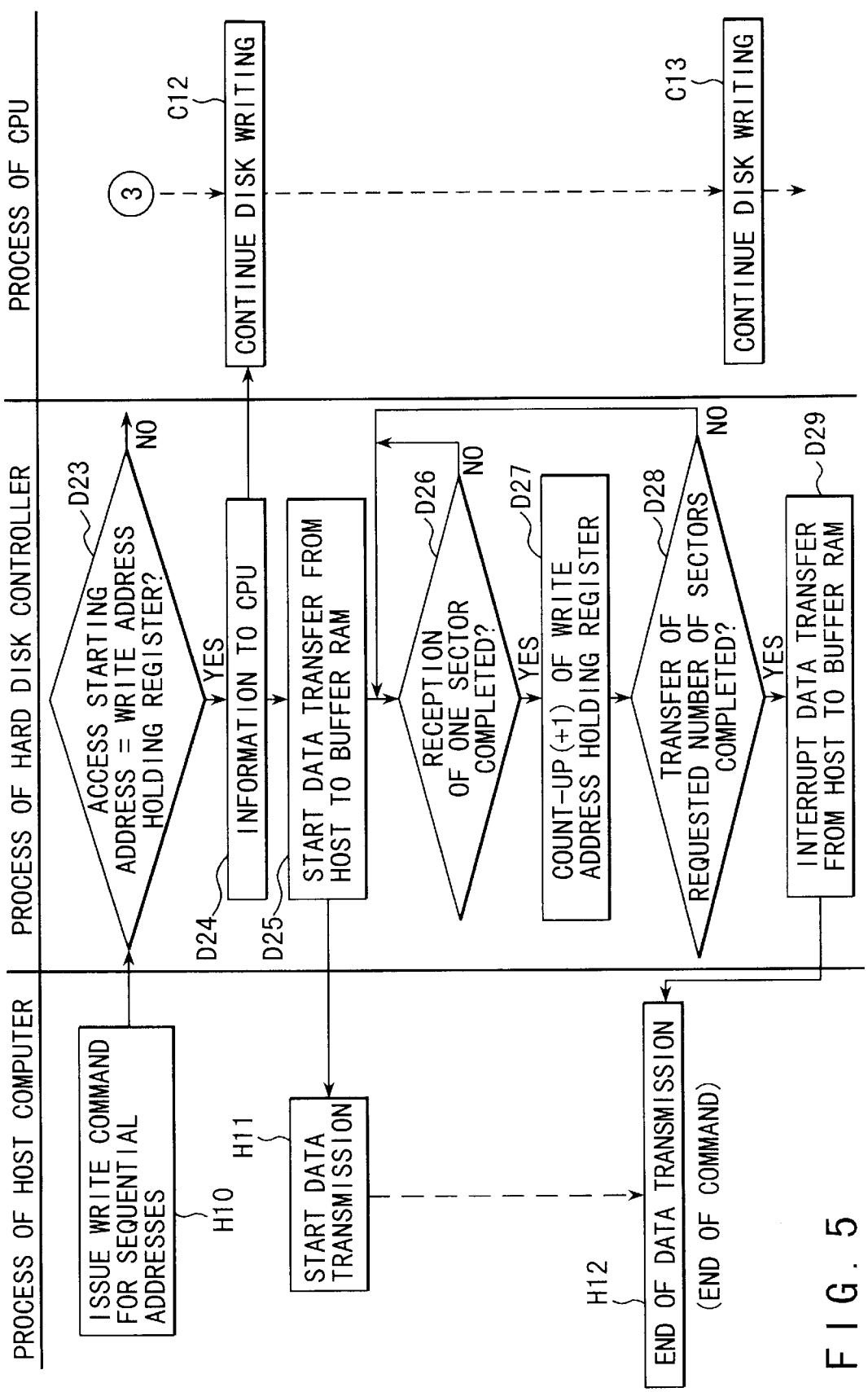
FIG. 5 is a flowchart for illustrating part of the operation of the first embodiment of the magnetic disk apparatus according to this invention.
Figure 6:
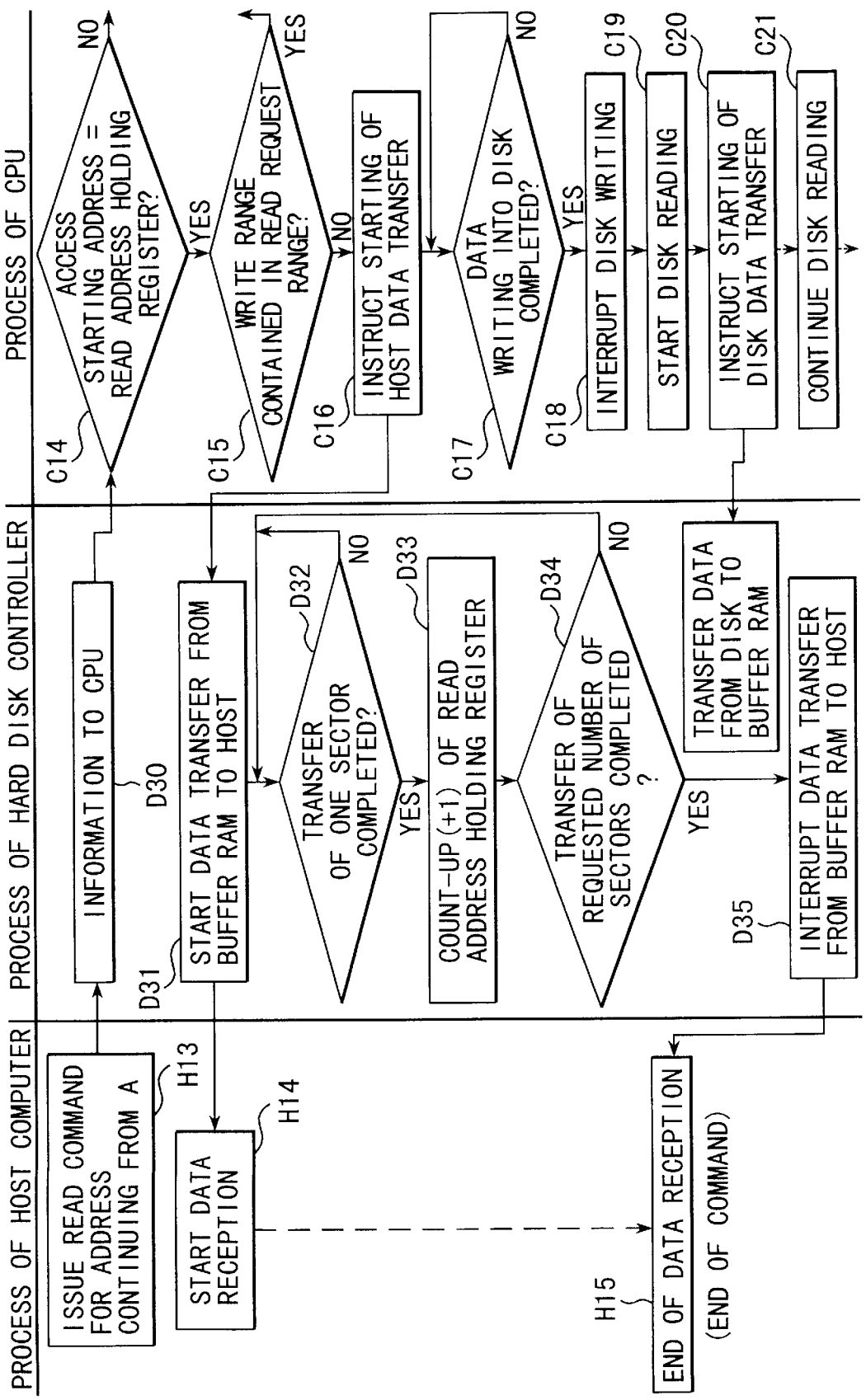
FIG. 6 is a flowchart for illustrating part of the operation of the first embodiment of the magnetic disk apparatus according to this invention.

FIGS. 2 to 6 are flowcharts for illustrating the operation of the first embodiment. That is, in the first embodiment, the sequential read cache operation in the read command and the sequential write cache operation in the write command are performed. These sequential read commands are processed as shown in FIGS. 2 and 3, then sequential write commands are processed as shown in FIGS. 4 and 5, and the read command for an address which continues from the access address of the preceding read command is processed as shown in FIG. 6. In the operation explained below, reference symbols in parentheses denote reference symbols of the steps.

First, when a read command is issued from the host system via the host interface 1 and magnetic disk apparatus interface 2 (H1), the HDC 4 holds the access starting address in the read address holding register 41 (D1) and informs the CPU 5 that the command has been issued (D2).

The CPU 5 instructs the HDC 4 to start the reading operation (disk reading) from the medium 9 in response to the received information (C1). Then, data transfer to the buffer RAM 3 is started (C2). Further, the CPU 5 instructs the HDC 4 to start the data transfer from the buffer RAM 3 (C3). However, in this case, the HDC 4 does not start the data transfer to the host system if a necessary amount of read data is not stored in the buffer RAM 3.

When a necessary amount of read data is read into the buffer RAM 3, the HDC 4 starts the data transfer to the host system (D4). At the time of data transfer, the value of the read address holding register 41 is incremented (increased) each time data of one sector is transferred (D6). When transfer of data of a requested number of sectors from the host system is completed (D8), the read address holding register 41 indicates the address of a next area. At this time, the HDC 4 is set into the command receivable state.

As shown in FIG. 3, if a next read command for sequential addresses is issued from the host system (H4), the HDC 4 compares the access starting address from the host system with the content of the read address holding register 41 (D9). In this case, since the compared addresses coincide with each other, the HDC informs the CPU 5 that the command has been received (D10) and starts the data transfer to the host system. Also, at this time, the data transfer is not started if a necessary amount of read data is not read into the buffer RAM 3.

When a necessary amount of read data is stored into the buffer RAM 3, the HDC 4 starts the data transfer to the host system (D11). Also, in this case, at the time of data transfer, the value of the read address holding register 41 is incremented each time data of one sector is transferred (D13).

When transfer of data of a requested number of sectors from the host system is completed (completion of the command), the read address holding register 41 indicates the address of a next area and the HDC 4 is set into the command receivable state (D15). Even at this time, the disk reading is continued (C4 to C6).

If a write command is issued in the host system as shown in FIG. 4 (H7), the HDC 4 stores the access starting address into the write address holding register 42 (D16) and informs the CPU 5 that the command has been issued (D17). At the same time, the HDC starts to transfer write data from the host system to the buffer RAM 3 (D18). At the time of transfer, each time data of one sector is received, the value of the write address holding register 42 is incremented (D20).

The CPU 5 instructs the HDC 4 to interrupt the disk reading from the medium 9 in response to the received information on issuance of the write command. At this time, data of an amount (a number of sectors) read into the buffer RAM 3 by the time of interruption of the disk reading is kept stored in the RAM 7 (C8). Further, the CPU 5 instructs the HDC 4 to start the write operation with respect to the medium 9 (C10) and starts to transfer write data which has been transferred to the buffer RAM 3 to the medium 9 (C11). However, the operation of writing data into the medium 9 is not effected until a necessary amount of data is transferred to the buffer RAM 3 from the host system.

After data of a requested amount from the host system has been received, the write address holding register 42 indicates the address of a next area and the HDC 4 is set into the command receivable state (D22).

At this time, if a next write command for sequential addresses is issued from the host system as shown in FIG. 5 (H10), the HDC 4 compares the access starting address from the host system with the content of the write address holding register 42 (D23). In this case, since the compared addresses coincide with each other, the HDC informs the CPU 5 that the command has been received (D24) and starts the data transfer from the host system (D25). Also, at this time, the value of the write address holding register 42 is incremented each time data of one sector is transferred at the time of transfer (D27).

Since the HDC 4 continues the writing operation into the medium 9 which is started in the step C10 (C12), the operation of writing data into the medium 9 is effected when write data is transferred from the host system to the buffer RAM 3 (C13).

After data of a requested amount from the host system has been received, the write address holding register 42 indicates the address of a next area. At this time, the HDC 4 is set into the command receivable state (D29).

Next, if a read command for an address which continues from the access address A obtained at the time of completion of the read command in the step H6 is issued from the host system as shown in FIG. 6 (H13), the HDC 4 informs the CPU 5 that the command has been received (D30). In this case, the access starting address is not stored in the read address holding register 41. This is because the HDC 4 recognizes that the preceding command is not a read command.

The CPU 5 compares the access starting address of the read command from the host system with the content of the read address holding register 42 in response to the above information (C14). In this case, since the compared addresses coincide with each other, the CPU 5 checks the write range of the write commands issued in the steps H7, H10 (C15). The write range is determined based on the write starting address obtained in the step H7 and the value of the write address holding register 42 at the present time. In this case, it is supposed that the write range lies before the read request address from the host system (that is, it does not influence read data in the buffer RAM 3).

The CPU 5 instructs the HDC 4 to start the data transfer from the buffer RAM 3 (C16). However, the HDC 4 interrupts the transfer of data to the host system when the necessary amount of data becomes no more present in the buffer RAM 3 (the data transfer is started again when data is newly read out). Also, in this case, each time data of one sector is transferred, the value of the read address holding register 41 is incremented (D33).

Further, the CPU 5 instructs the HDC 4 to interrupt the operation of writing data into the medium 9 (C18). However, it is supposed that the operation is not interrupted until all the write data stored in the buffer RAM 3 is written into the medium 9. The CPU 5 waits until the operation of writing data into the medium 9 is completed (C17).

Further, the CPU 5 refers to the amount of read data read into the buffer RAM 3 (stored in the RAM 7 in the step C8) and instructs the HDC 4 to start the operation of reading out data from the medium 9 for the succeeding addresses (C19). After data of a requested number of sectors from the host system has been transferred, the read address holding register 41 indicates the address of a next area and the HDC 4 is set into the command receivable state (D35).

As described above, according to the first embodiment, since the HDC 4 includes the "read address holding register 41" and the "write address holding register 42", the cache operation in the read command using the read address holding register 41 and the cache operation in the write command using the write address holding register 42 can be independently effected. With this construction, in a case where the read commands and write commands are alternately issued, it is only necessary to transfer read data without effecting the read operation with respect to the medium 9 if the read data which is already read into the buffer RAM 3 is present. Therefore, it is possible to execute the issued read command at high speed.

(Second Embodiment)

Figure 7:
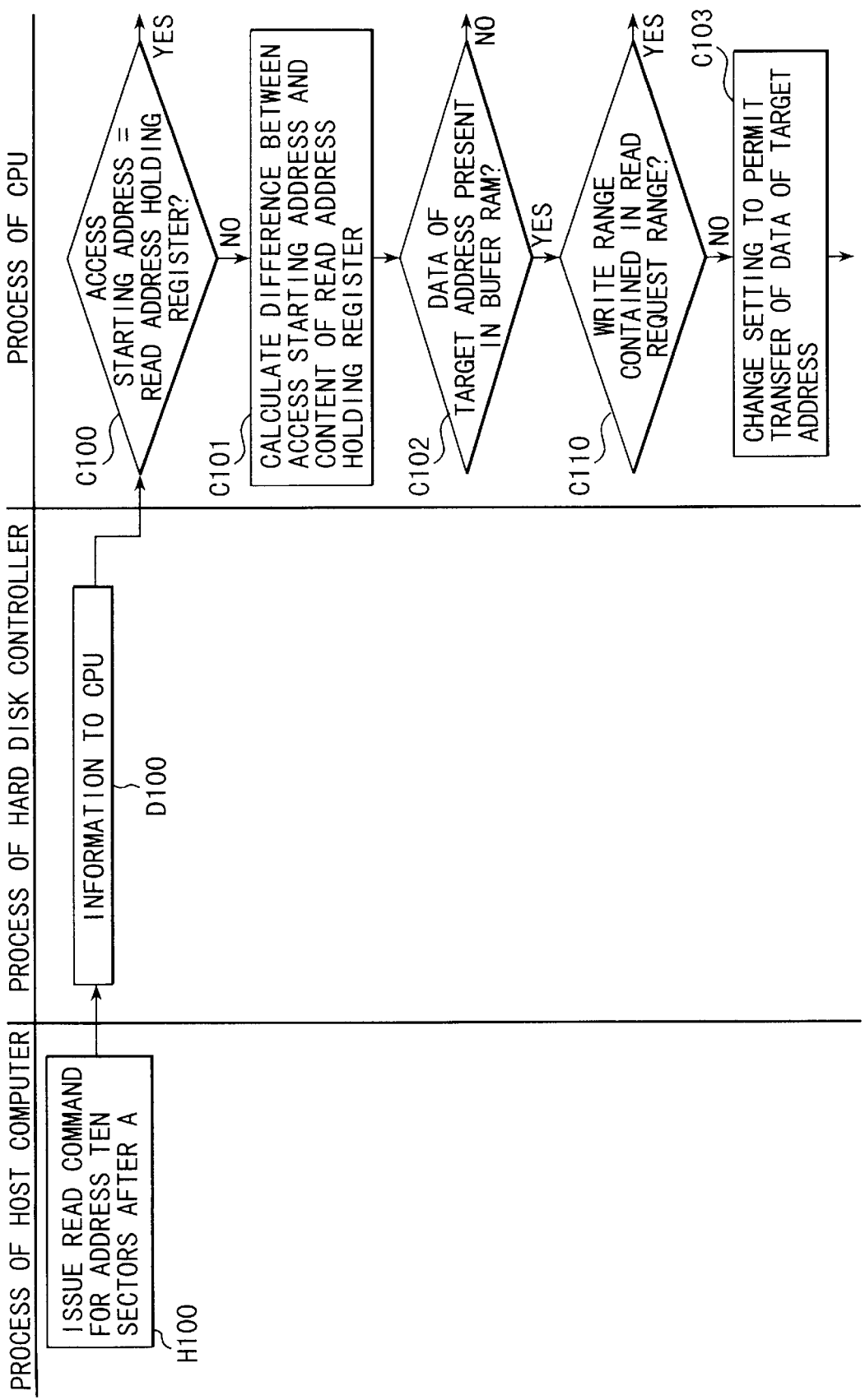
FIG. 7 is a flowchart for illustrating part of the operation of a second embodiment of the magnetic disk apparatus according to this invention.

The second embodiment is a modification of the first embodiment and relates to the cache operation effected in a case where the access addresses of a read command are not completely sequential. That is, in the second embodiment, a read command for an address which lies ten sectors after an access address A obtained at the time of completion of the read command in the step H6 is issued from the host system as shown in FIG. 7 instead of issuing the read command in the step H13 shown in FIG. 6 in the first embodiment (H100).

The HDC 4 informs the CPU 5 that the command has been received (D100). In this case, the access starting address is not stored in the read address holding register 41. This is because the HDC 4 recognizes that the preceding command is not a read command.

The CPU 5 compares the access starting address of the read command issued from the host system with the content of the read address holding register 41 in response to reception of the above information (C100). In this case, since the compared addresses do not coincide with each other, the CPU 5 calculates a difference between the value of the read address holding register 41 and the access starting address (C101).

Then, the CPU 5 determines whether or not data of a target address is present in the buffer RAM 3 (C102). If the result of determination is "YES", whether or not the read request range contains a range in which data is written (C110). If the result of determination is "NO", the CPU adequately changes the settings to permit data of the target address to be transferred (C103) and instructs the HDC 4 to start the transfer of host data as shown in FIG. 7 (C104). However, the HDC 4 interrupts the data transfer to the host system when the necessary amount of data becomes no more present in the buffer RAM 3 (the data transfer is started again when data is newly read out). Also, in this case, each time data of one sector is transferred, the value of the read address holding register 41 is incremented (D103).

Further, the CPU 5 instructs the HDC 4 to interrupt the operation of writing data into the medium 9 (C106). However, it is supposed that the write operation is not interrupted until all the write data stored in the buffer RAM 3 is written into the medium 9. At this time, the CPU 5 waits for completion of the operation of writing data into the medium 9 (C105).

The CPU 5 refers to the amount of read data read into the buffer RAM 3 (stored in the RAM 7 in the step C8) and instructs the HDC 4 to start the operation of reading data from the medium 9 for the succeeding addresses (C107). After data of a requested number of sectors from the host system has been transferred, the read address holding register 41 indicates the address of a next area and the HDC 4 is set into the command receivable state (D105).

As described above, according to the second embodiment, even if the access addresses of the read command are not completely sequential, the access starting address of the read command is compared with the content of the read address holding register 41, a difference between the value of the read address holding register 41 and the access starting address is calculated, and whether or not data of the target address is present in the buffer RAM 3 is determined. Further, if it is determined that data of the target address is present, the setting is adequately changed to permit data of the target address to be transferred. Therefore, like the first embodiment, since the HDC 4 includes the "read address holding register 41" and the "write address holding register 42", the cache operation in the read command using the read address holding register 41 and the cache operation in the write command using the write address holding register 42 can be independently effected.

With this construction, in a case where a write command is issued while read commands are sequentially issued and then sequential read commands are issued again, it is only necessary to transfer read data without effecting the read operation with respect to the medium 9 if the read data which is already read into the buffer RAM 3 is present. Therefore, it is possible to execute the issued read command at high speed.

(Third Embodiment)

Figure 9:
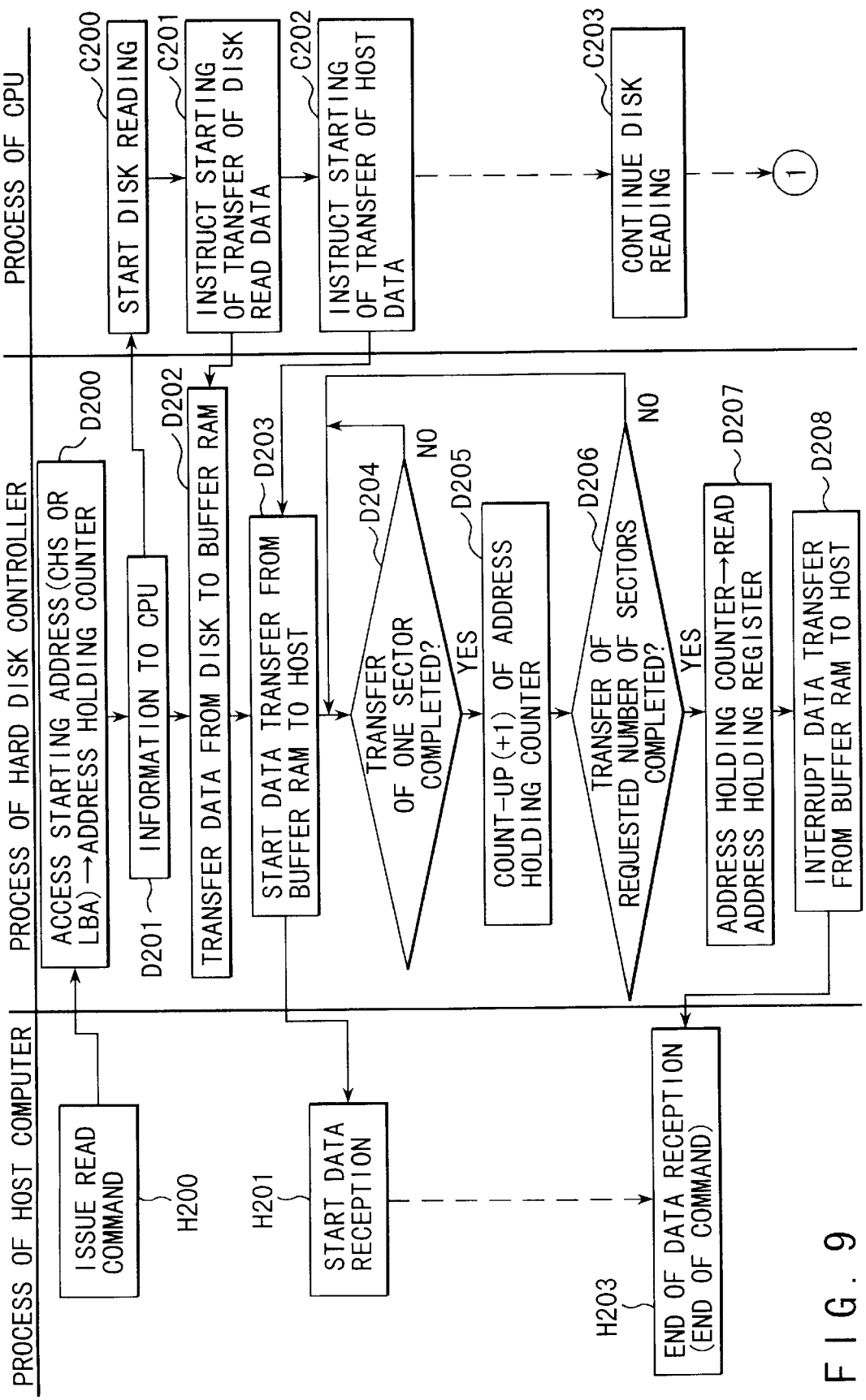
FIG. 9 is a flowchart for illustrating part of the operation of a third embodiment of the magnetic disk apparatus according to this invention.
Figure 10:
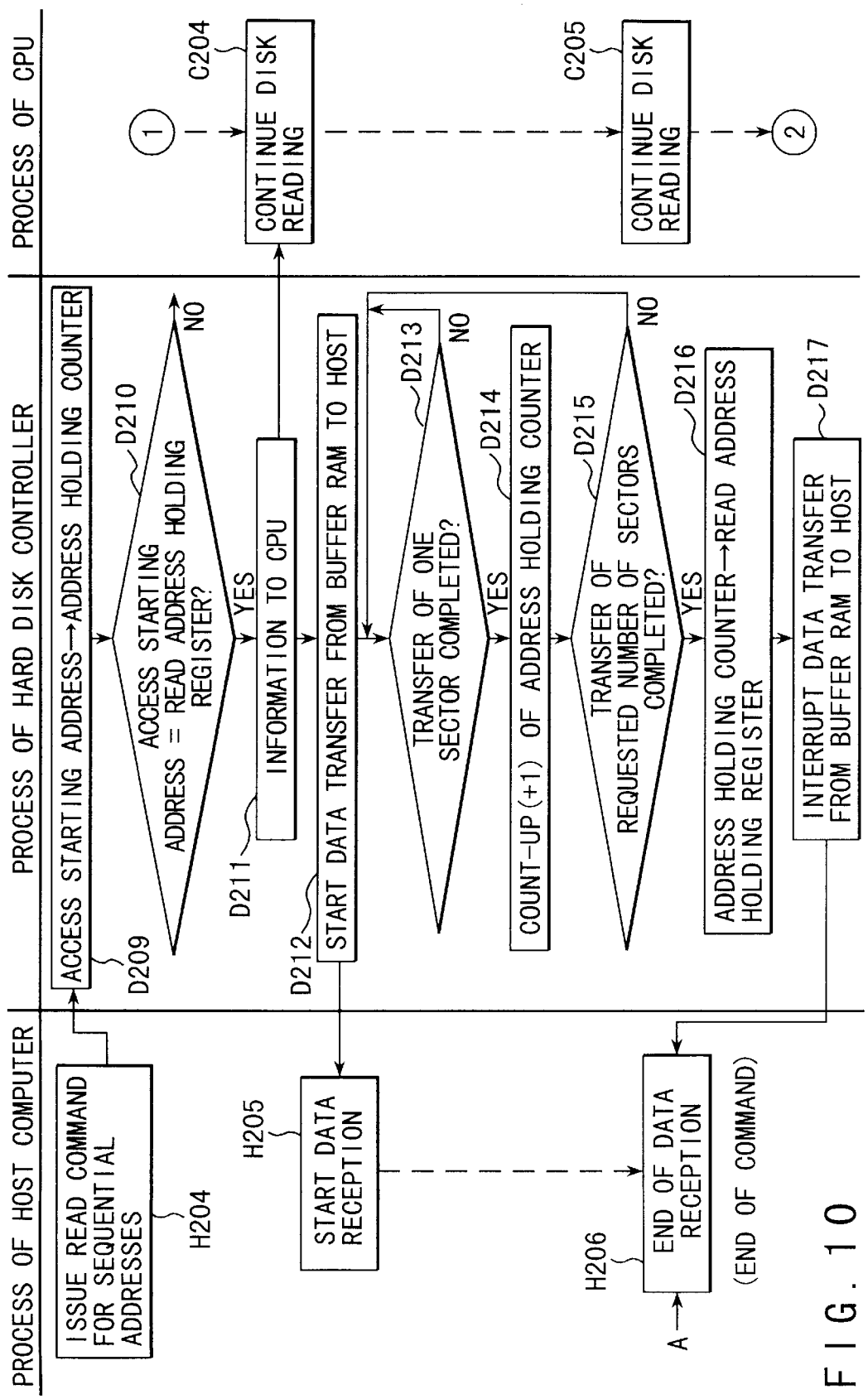
FIG. 10 is a flowchart for illustrating part of the operation of the third embodiment of the magnetic disk apparatus according to this invention.
Figure 11:
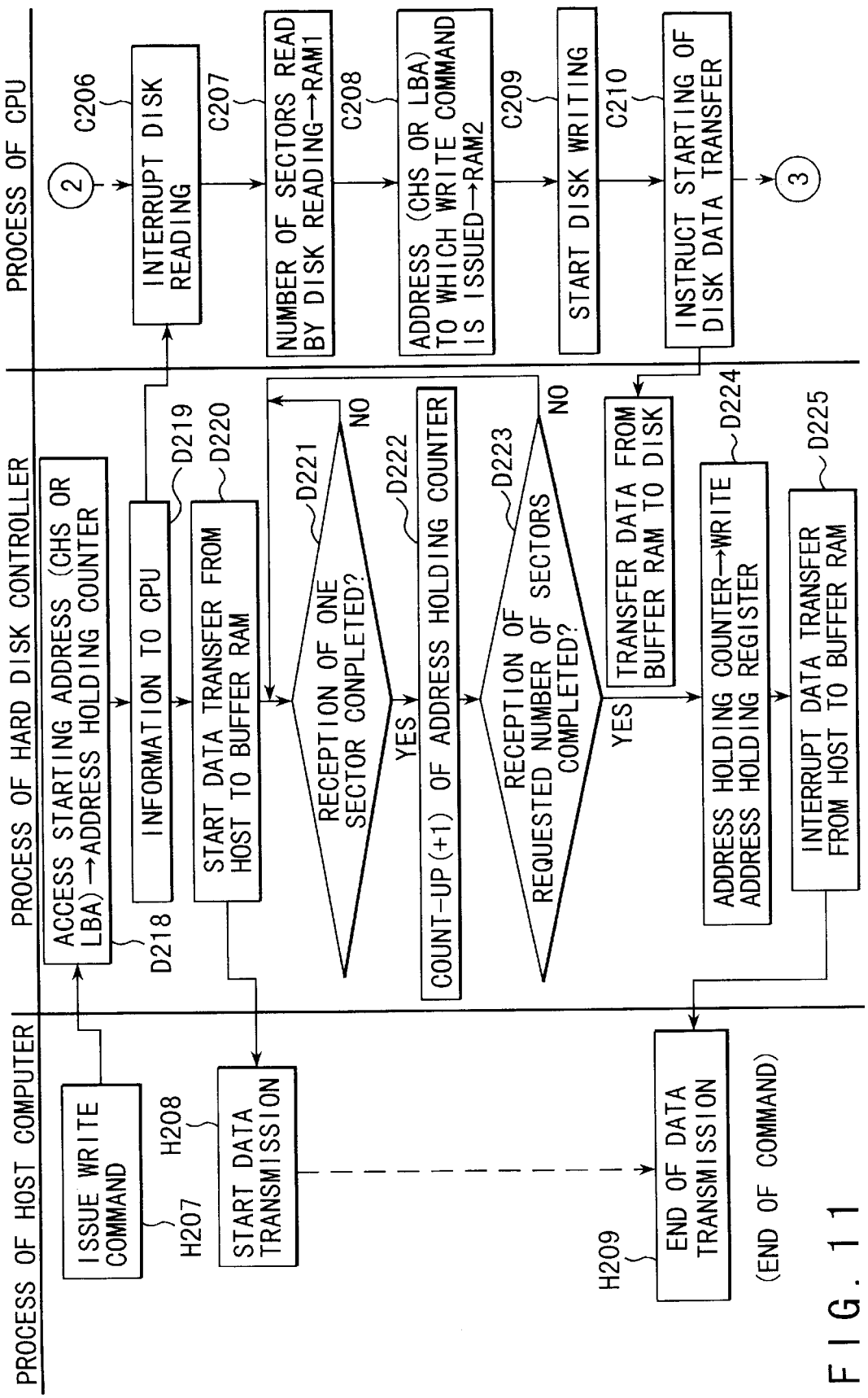
FIG. 11 is a flowchart for illustrating part of the operation of the third embodiment of the magnetic disk apparatus according to this invention.
Figure 12:
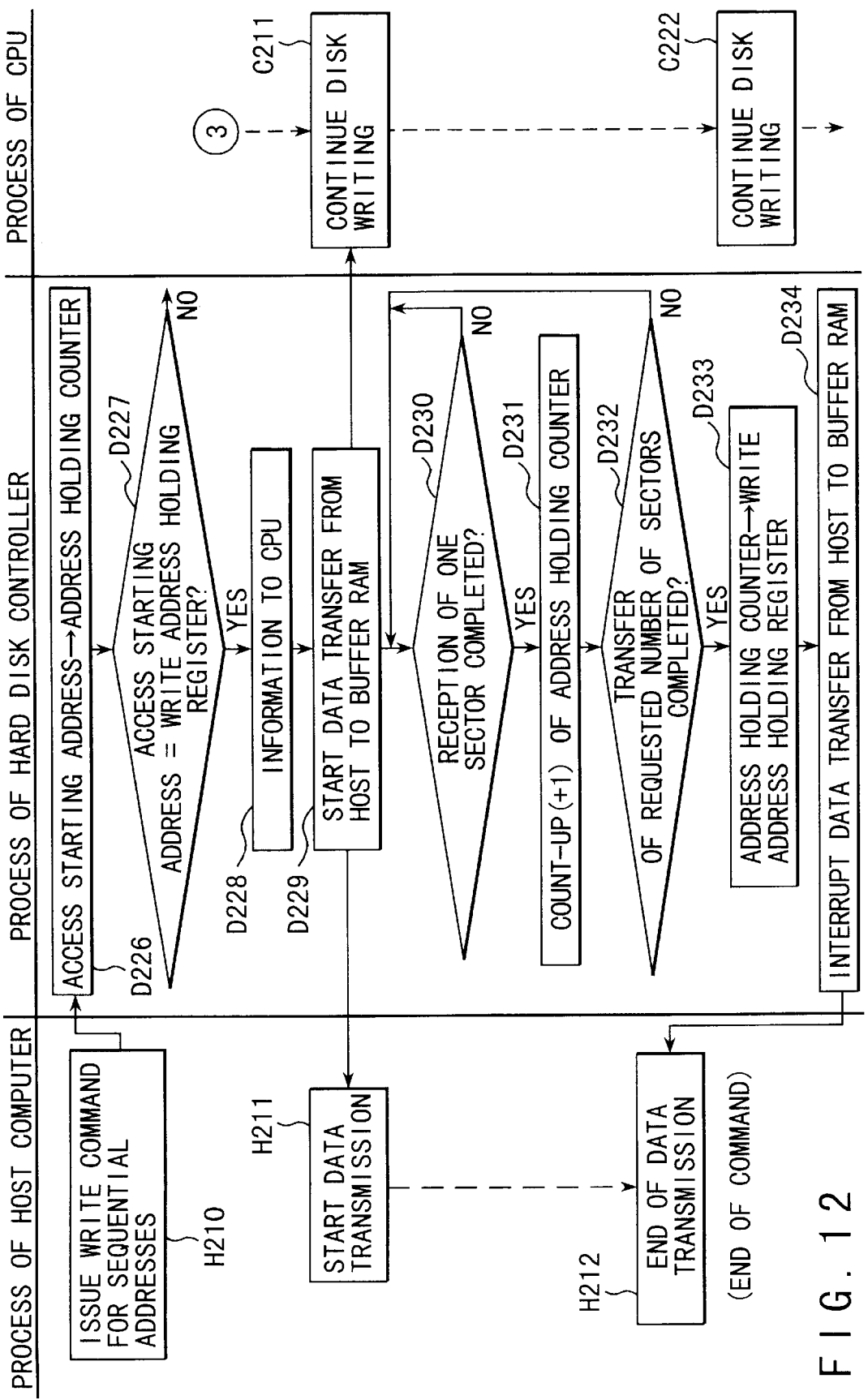
FIG. 12 is a flowchart for illustrating part of the operation of the third embodiment of the magnetic disk apparatus according to this invention.
Figure 13:
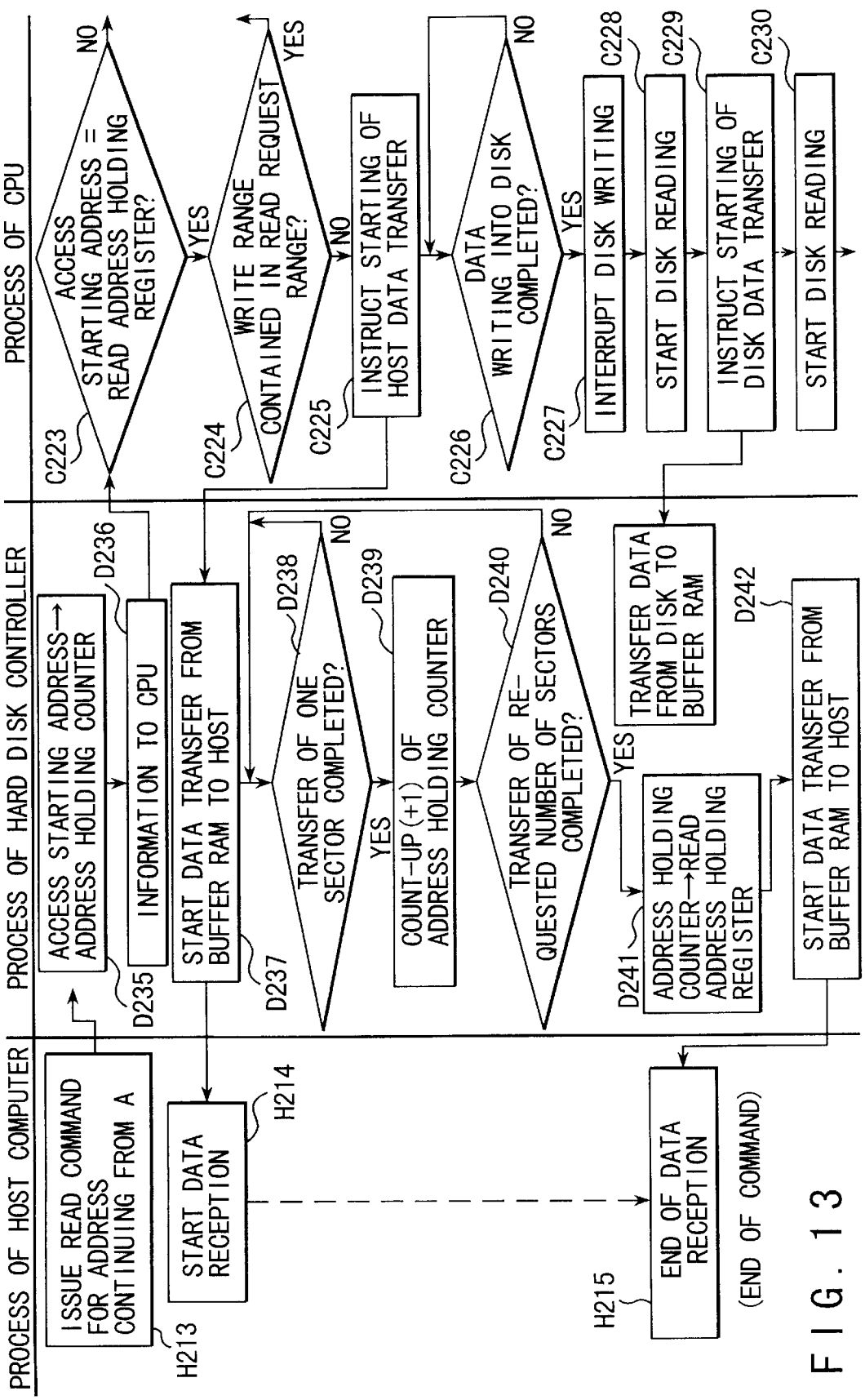
FIG. 13 is a flowchart for illustrating part of the operation of the third embodiment of the magnetic disk apparatus according to this invention.

The third embodiment is a first modification of the construction of the address holding register in the first or second embodiment. FIGS. 9 to 13 are flowcharts for illustrating the operation of the third embodiment. The operation of the third embodiment is similar to that of the first embodiment except for a difference in the construction of the address holding register. That is, in this embodiment, sequential read commands are processed as shown in FIGS. 9 and 10, then sequential write commands are processed as shown in FIGS. 11 and 12, and a read command for an address which continues from the access address of the preceding read command is processed as shown in FIG. 13.

First, if a read command is issued from the host system via the host interface 1 and magnetic disk apparatus interface 2 (H200), the HDC 4 transfers an access starting address to an address holding counter (not shown) (D200) and informs the CPU 5 that the command has been issued (D201).

The CPU 5 instructs the HDC 4 to start the read operation (disk reading) with respect to the medium 9 in response to reception of the above information (C200). Then, data transfer to the buffer RAM 3 is started (C202). Further, the CPU 5 instructs the HDC 4 to start the data transfer from the buffer RAM 3 (C201). However, in this case, the HDC 4 does not start the data transfer to the host system if a necessary amount of read data is not stored in the buffer RAM 3.

When a necessary amount of read data is read into the buffer RAM, the HDC 4 starts the data transfer to the host system (D203). At the time of data transfer, the value of the address holding counter is incremented (increased) each time data of one sector is transferred (D205). When transfer of data of a requested number of sectors from the host system is completed, the content of the read address counter is transferred to the read address holding register 41. The read address holding register 41 indicates the address of a next area. At this time, the HDC 4 is set into the command receivable state.

As shown in FIG. 10, if a next read command for sequential addresses is issued from the host system (H204), the HDC 4 transfers the access starting address to the address holding counter and then compares the access starting address from the host system with the content of the read address holding register 41 (D210). In this case, since the compared addresses coincide with each other, the HDC informs the CPU 5 that the command has been received (D211) and starts the data transfer to the host system. Also, at this time, the data transfer is not started if a necessary amount of read data is not read into the buffer RAM 3.

When a necessary amount of read data is stored into the buffer RAM 3, the HDC 4 starts the data transfer to the host system (D212). Also, in this case, at the time of data transfer, the value of the read address holding counter is incremented each time data of one sector is transferred (D214). After transfer of data of a requested number of sectors from the host system is completed (end of the command), the content of the read address counter is transferred to the read address holding register 41 (D216). At this time, the read address holding register 41 indicates the address of a next area and the HDC 4 is set into the command receivable state (D217). Even at this time, the disk reading is continued (C203 to C205).

If a write command is issued in the host system as shown in FIG. 11 (H207), the HDC 4 transfers the access starting address to the address holding counter (D218) and informs the CPU 5 that the command has been issued (D219). At the same time, the HDC starts to transfer write data from the host system to the buffer RAM 3 (D220). At the time of transfer, each time data of one sector is received, the value of the address holding counter is incremented (D222).

The CPU 5 instructs the HDC 4 to interrupt the disk reading from the medium 9 in response to the received information on issuance of the write command (C206). At this time, data of an amount (a number of sectors) read into the buffer RAM 3 by the time of interruption of the disk reading is kept stored in the RAM 7 (C207). Further, the CPU 5 instructs the HDC 4 to start the write operation with respect to the medium 9 (C209) and starts to transfer write data which has been transferred to the buffer RAM 3 to the medium 9 (C210). However, the operation of writing data into the medium 9 is not effected until a necessary amount of data is transferred to the buffer RAM 3 from the host system.

After data of a requested amount from the host system is received, the content of the address holding counter is transferred to the write address holding register 42. The value of the write address holding register 42 indicates the address of a next area and the HDC 4 is set into the command receivable state (D225).

At this time, if a next write command for sequential addresses is issued from the host system as shown in FIG. 12 (H210), the HDC 4 transfers the access starting address to the address holding counter (D226) and compares the access starting addresses from host system with the content of the write address holding register 42 (D227). In this case, since the compared addresses coincide with each other, the HDC informs the CPU 5 that the command has been received (D228) and starts the data transfer from the host system (D229). Also, at this time, the value of the address holding counter is incremented each time data of one sector is received at the time of transfer (D231).

Since the HDC 4 continues the writing operation into the medium 9 which is started in the step C209 (C211), the operation of writing data into the medium 9 is effected when write data is transferred from the host system to the buffer RAM 3 (C222).

After data of a requested amount from the host system is received, the content of the address holding counter is transferred to the write address holding register 42. The value of the write address holding register 42 indicates the address of a next area. At this time, the HDC 4 is set into the command receivable state (D234). Next, if a read command with respect to an address which continues from the access address used at the time of completion of the read command in the step H206 is issued from the host system as shown in FIG. 13 (H213), the HDC 4 transfers the access starting address to the address holding counter (D235) and informs the CPU 5 that the command has been received (D236).

The CPU 5 compares the access starting address of the read command issued from the host system with the content of the read address holding register 41 in response to reception of the above information (C223). In this case, since the compared addresses coincide with each other, the CPU 5 checks the write range of the write commands issued in the steps H207, H210 (C224). The write range is determined based on the write starting address used in the step H207 and the value of the write address holding register 42 at the present time. In this case, it is supposed that the write range lies before the read request address from the host system (that is, it does not influence read data in the buffer RAM 3).

The CPU 5 instructs the HDC 4 to start the data transfer from the buffer RAM 3 (C225). However, the HDC 4 interrupts the transfer of data to the host system when the necessary amount of data becomes no more present in the buffer RAM 3 (the data transfer is started again when data is newly read out). Also, in this case, each time data of one sector is transferred, the value of the address holding counter is incremented (D239).

Further, the CPU 5 instructs the HDC 4 to interrupt the operation of writing data into the medium 9 (C227). However, the write operation is not interrupted until all the write data stored in the buffer RAM 3 is written into the medium 9. In this case, it is assumed that the CPU 5 waits for completion of the operation of writing data into the medium 9 (C226). Further, the CPU 5 refers to the amount of read data stored in the RAM 7 in the step C207 and read into the buffer RAM 3 and instructs the HDC 4 to start the operation of reading data from the medium 9 for the succeeding addresses (C229).

After data of a requested number of sectors from the host system is transferred, the content of the address holding counter is transferred to the read address holding register 41. The value of the read address holding register 41 indicates the address of a next area and the HDC 4 is set into the command receivable state (D242).

As described above, according to the third embodiment, since the HDC 4 includes the address holding counter for holding access addresses for the buffer RAM 3 provided by a read command or write command from the host system, the read address holding register 41 for holding the content of the address holding counter at the time of completion of the read command and the write address holding register 42 for holding the content of the address holding counter at the time of completion of the write command, the cache operation in the read command using the address holding counter and the read address holding register 41 and the cache operation in the write command using the address holding counter and the write address holding register 42 can be independently effected.

With this construction, in a case where a write command is issued while read commands are sequentially issued and then sequential read commands are issued again, it is only necessary to transfer read data without effecting the read operation with respect to the medium 9 if the read data which is already read into the buffer RAM 3 is present. Therefore, it is possible to execute the issued read command at high speed.

(Fourth Embodiment)

Figure 14:
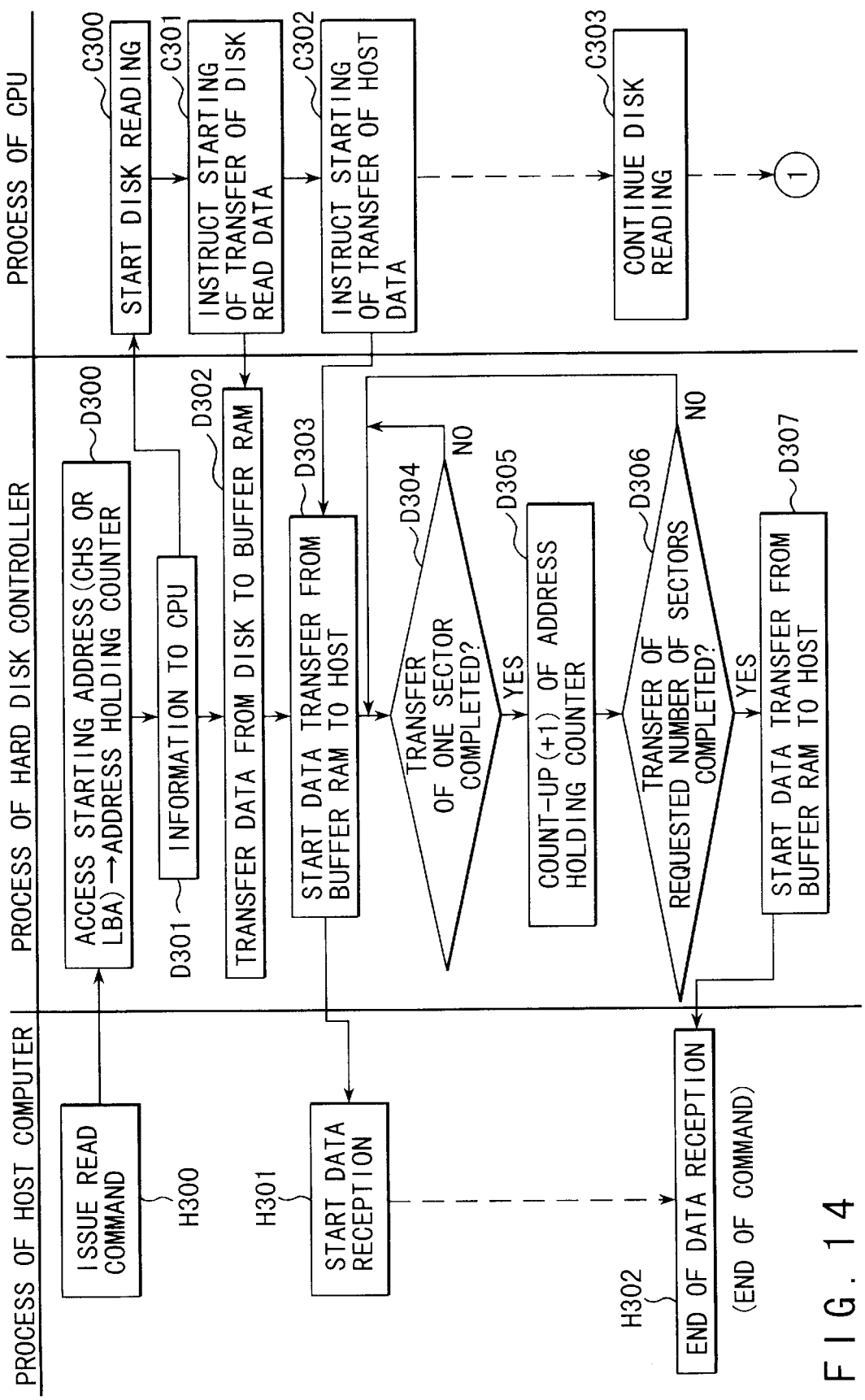
FIG. 14 is a flowchart for illustrating part of the operation of a fourth embodiment of the magnetic disk apparatus according to this invention.
Figure 15:
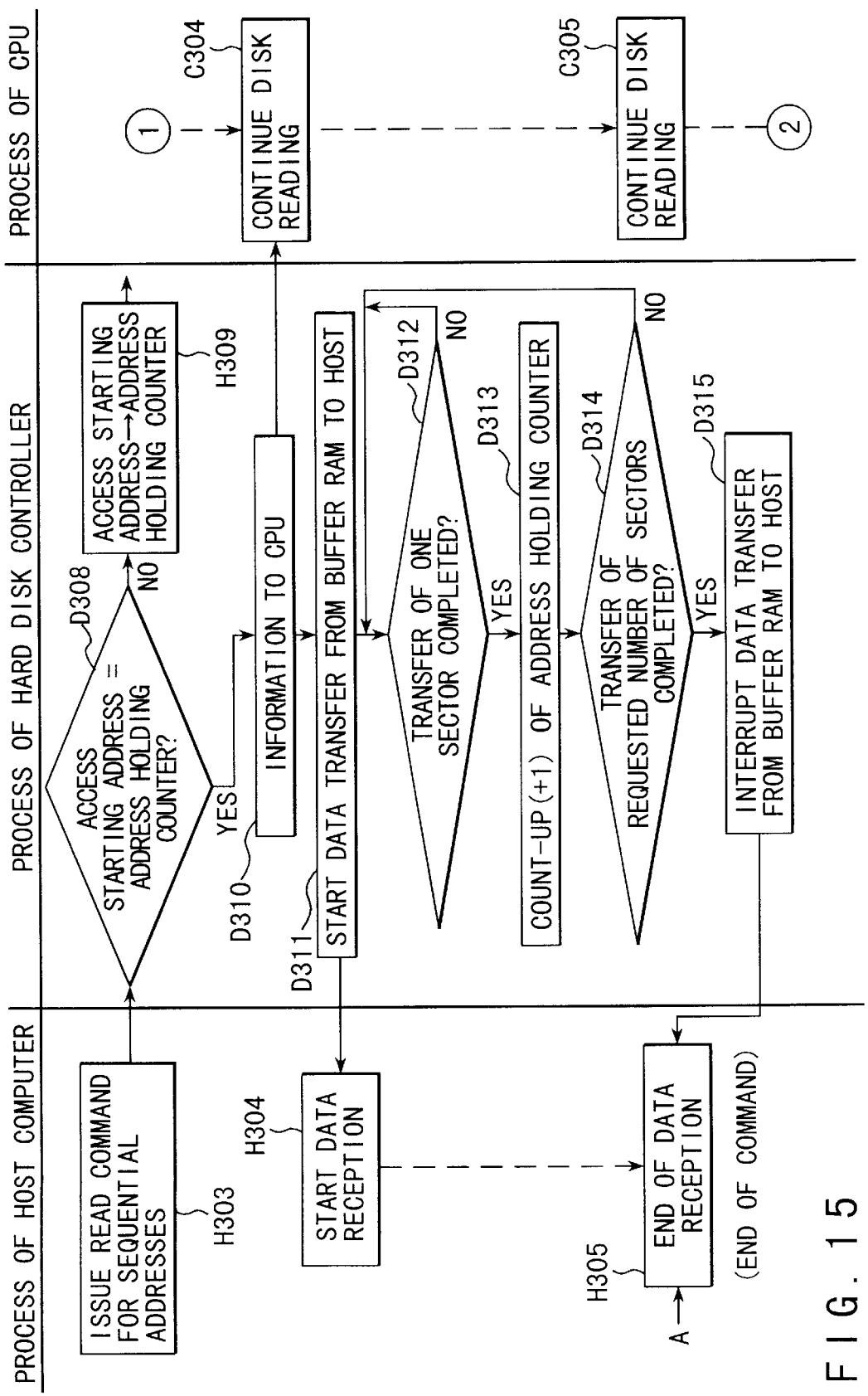
FIG. 15 is a flowchart for illustrating part of the operation of the fourth embodiment of the magnetic disk apparatus according to this invention.
Figure 16:
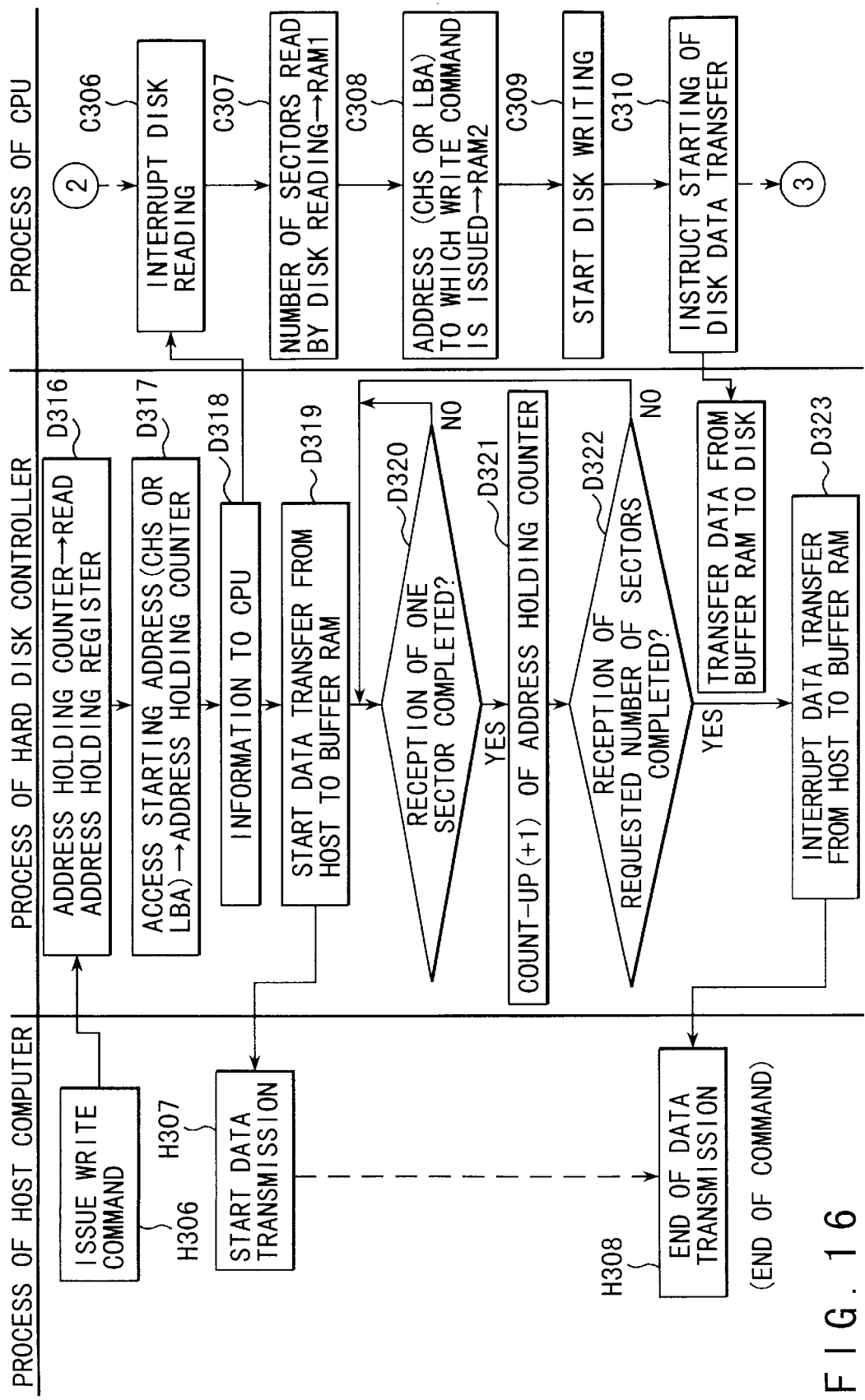
FIG. 16 is a flowchart for illustrating part of the operation of the fourth embodiment of the magnetic disk apparatus according to this invention.
Figure 17:
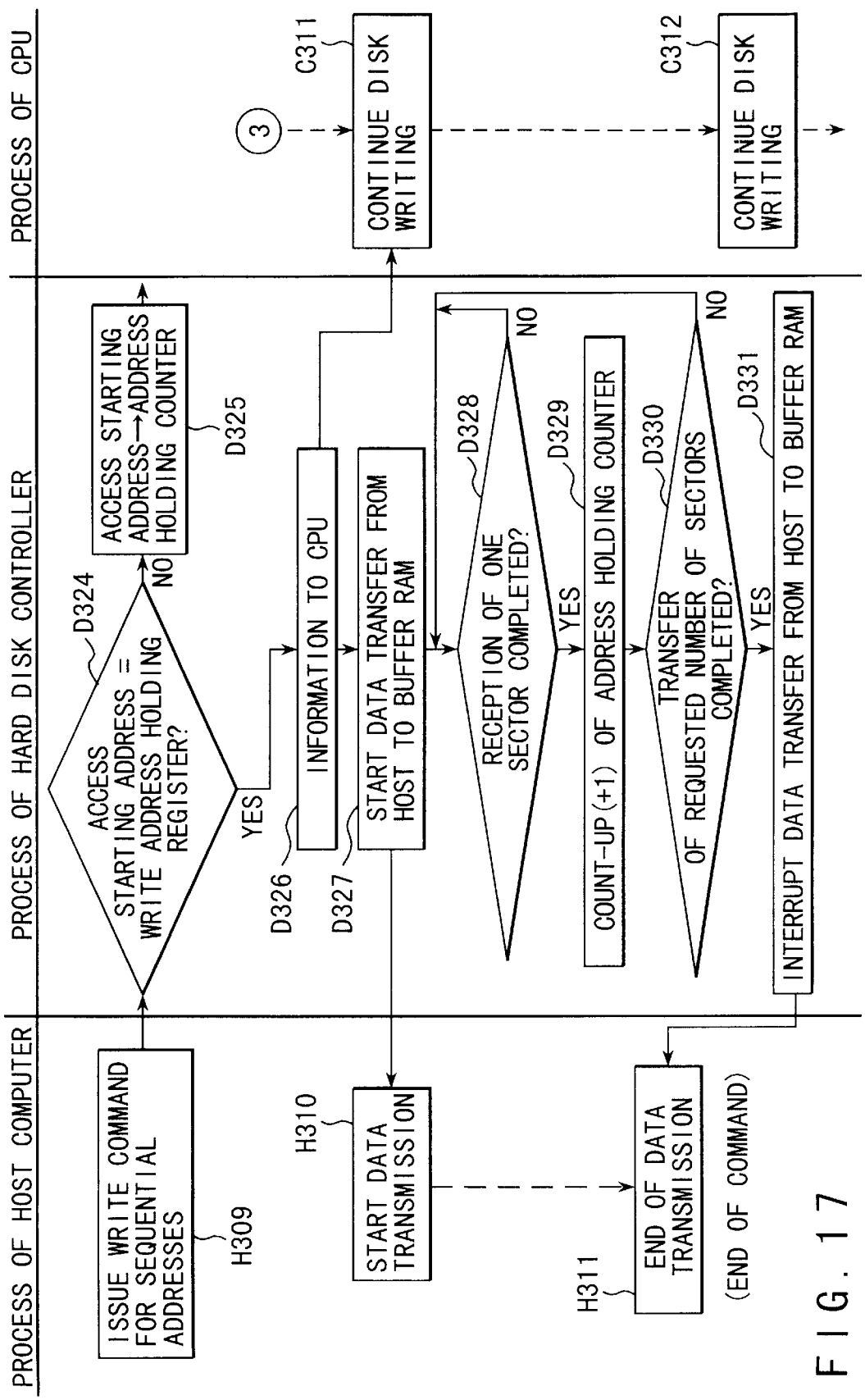
FIG. 17 is a flowchart for illustrating part of the operation of the fourth embodiment of the magnetic disk apparatus according to this invention.
Figure 18:
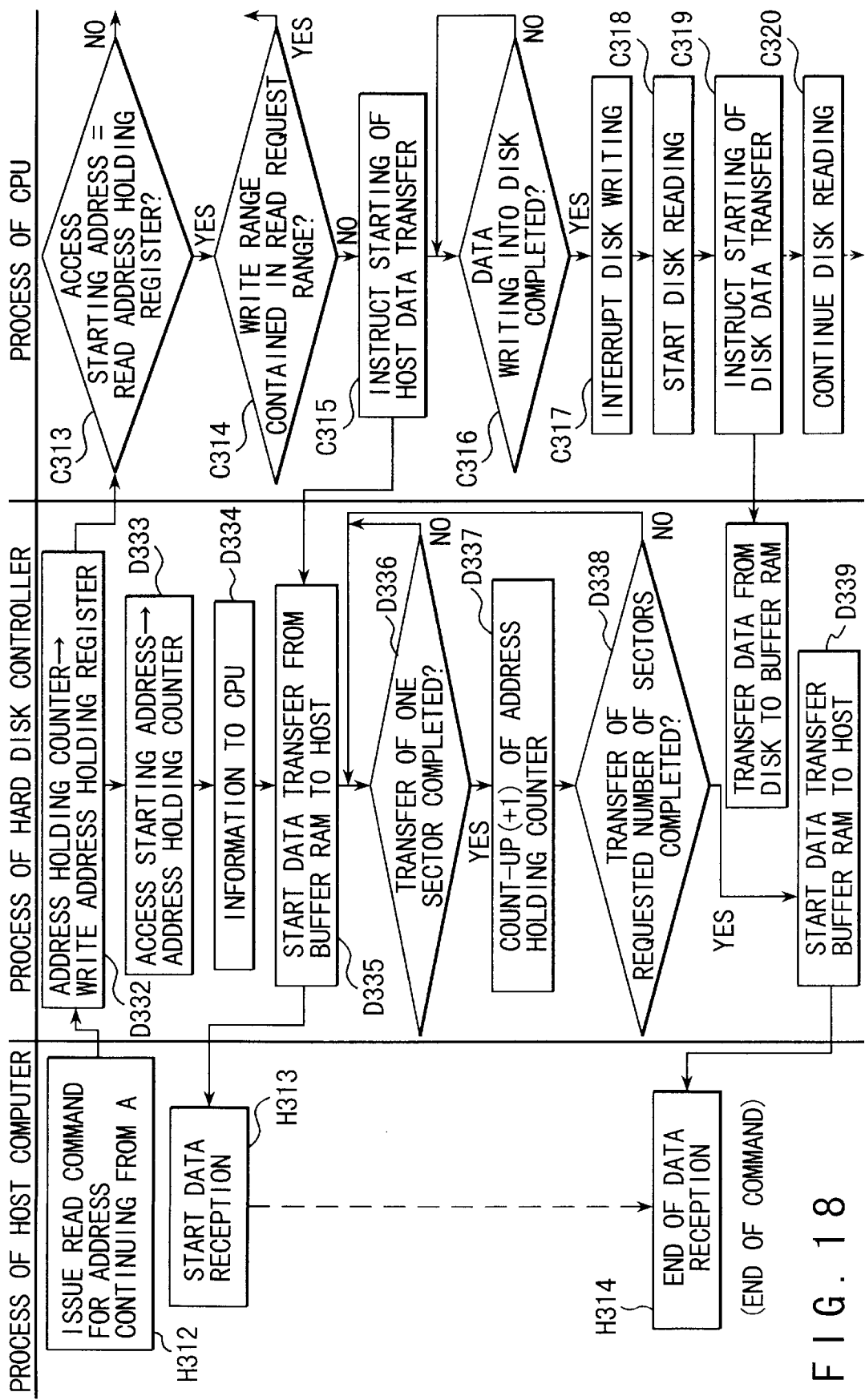
FIG. 18 is a flowchart for illustrating part of the operation of the fourth embodiment of the magnetic disk apparatus according to this invention.

The fourth embodiment is a second modification of the construction of the address holding register in the first or second embodiment. FIGS. 14 to 18 are flowcharts for illustrating the operation of the fourth embodiment. The operation of the fourth embodiment is similar to that of the first embodiment except for a difference in the construction of the address holding register. That is, in this embodiment, sequential read commands are processed as shown in FIGS. 14 and 15, then sequential write commands are processed as shown in FIGS. 16 and 17, and a read command for an address which continues from the access address of the preceding read command is processed as shown in FIG. 18.

First, if a read command is issued from the host system via the host interface 1 and magnetic disk apparatus interface 2 (H300), the HDC 4 transfers an access starting address to an address holding counter (not shown) (D300) and instructs the CPU 5 that the command has been issued (D301).

The CPU 5 instructs the HDC 4 to start the read operation (disk reading) with respect to the medium 9 in response to reception of the above information (C300). Then, data transfer to the buffer RAM 3 is started (C302). Further, the CPU 5 instructs the HDC 4 to start the data transfer from the buffer RAM 3 (C301). However, in this case, the HDC 4 does not start the data transfer to the host system if a necessary amount of read data is not stored in the buffer RAM 3.

When a necessary amount of read data is read into the buffer RAM, the HDC 4 starts the data transfer to the host system (D303). At the time of data transfer, the value of the address holding counter is incremented (increased) each time data of one sector is transferred (D305). When transfer of data of a requested number of sectors from the host system is completed, the value of the read address holding register 41 indicates the address of a next area. At this time, the HDC 4 is set into the command receivable state (D307).

As shown in FIG. 15, if a next read command for sequential addresses is issued from the host system (H303), the HDC 4 compares the access starting address from the host system with the content of the address holding counter (D308). In this case, if the compared addresses do not coincide with each other, the HDC 4 transfers the access starting address to the address holding counter (D309). On the other hand, if the compared addresses coincide with each other, the HDC informs the CPU 5 that the command has been received (D310) and starts the data transfer to the host system. Also, at this time, the data transfer is not started if a necessary amount of read data is not read into the buffer RAM 3.

When a necessary amount of read data is stored into the buffer RAM 3, the HDC 4 starts the data transfer to the host system (D311). Also, in this case, at the time of data transfer, the value of the read address holding counter is incremented each time data of one sector is transferred (D313). After transfer of data of a requested number of sectors from the host system is completed (end of the command), the HDC 4 is set into the command receivable state (D315). Even at this time, the disk reading is continued (C303 to C305).

If a write command is issued in the host system as shown in FIG. 16 (H306), the HDC 4 transfers the content of the address holding counter to the read address holding register 41 (D316), transfers the access starting address to the address holding counter (D317) and informs the CPU 5 that the command has been issued (D318). At the same time, the HDC starts to transfer write data from the host system to the buffer RAM 3 (D319). At the time of transfer, each time data of one sector is received, the value of the address holding counter is incremented (D321).

The CPU 5 instructs the HDC 4 to interrupt the disk reading from the medium 9 in response to the received information on issuance of the write command (C306). At this time, data of an amount (a number of sectors) read into the buffer RAM 3 by the time of interruption of the disk reading is kept stored in the RAM 7 (C307). Further, the CPU 5 instructs the HDC 4 to start the write operation with respect to the medium 9 (C309) and starts to transfer write data which has been transferred to the buffer RAM 3 to the medium 9 (C310). However, the operation of writing data into the medium 9 is not effected until a necessary amount of data is transferred to the buffer RAM 3 from the host system. After data of a requested amount from the host system is received, the HDC 4 is set into the command receivable state (D323).

At this time, if a next write command for sequential addresses is issued from the host system as shown in FIG. 17 (H309), the HDC 4 compares the access starting addresses from the host system with the content of the write address holding register 42 (D324). In this case, if the compared addresses do not coincide with each other, the HDC transfers the access starting address to the address holding counter (D325), and if the compared addresses coincide with each other, the HDC informs the CPU 5 that the command has been received (D326) and starts the data transfer from the host system (D327). Also, at this time, the value of the address holding counter is incremented each time data of one sector is received at the time of transfer (D329).

Since the HDC 4 continues the operation of writing data into the medium 9 which is started in the step C309 (C311), the operation of writing data into the medium 9 is effected when write data is transferred from the host system to the buffer RAM 3 (C312).

After data of a requested amount from the host system is received, the HDC 4 is set into the command receivable state (D331).

Next, if a read command for an address which continues from the access address used at the time of completion of the read command in the step H305 is issued from the host system as shown in FIG. 18 (H312), the HDC 4 transfers the content of the address holding counter to the write address holding register 42 (D332), transfers the access starting address to the address holding counter (D333) and informs the CPU 5 that the command has been received (D334).

The CPU 5 compares the content of the read address holding register 42 with the access starting address of the read command issued from the host system in response to reception of the above information (C313). In this case, since the compared addresses coincide with each other, the CPU 5 checks the write range of the write commands issued in the steps H306, H309 (C314). The write range is determined based on the write starting address used in the step H306 and the value of the write address holding register 42 at the present time. In this case, it is supposed that the write range lies before the read request address from the host system (that is, it does not influence read data in the buffer RAM 3). Further, the CPU 5 instructs the HDC 4 to start the data transfer from the buffer RAM 3 (C315). However, the HDC 4 interrupts the transfer of data to the host system when the necessary amount of data becomes no more present in the buffer RAM 3 (the data transfer is started again when data is newly read out). Also, in this case, each time data of one sector is transferred, the value of the address holding counter is incremented (D337).

Further, the CPU 5 instructs the HDC 4 to interrupt the operation of writing data into the medium 9 (C317). However, it is supposed that the operation is not interrupted until all the write data stored in the buffer RAM 3 is written into the medium 9. In this case, it is assumed that the CPU 5 waits for completion of the operation of writing data into the medium 9 (C316).

Further, the CPU 5 refers to the amount of read data stored in the RAM 7 in the step C307 and read into the buffer RAM 3 and instructs the HDC 4 to start the operation of reading out data from the medium 9 for the succeeding addresses (C319).

When data of a requested number of sectors from the host is transferred, the HDC 4 is set into the command receivable state (D339).

As described above, according to the fourth embodiment, since the HDC 4 includes the address holding counter for holding the access address for the buffer RAM 3 specified by a read command or write command from the host system, the read address holding register 41 for holding the content of the address holding counter in a case where the preceding command is a read command and the present command is a write command, and the write address holding register 42 for holding the content of the address holding counter in a case where the preceding command is a write command and the present command is a read command, the cache operation in the read command using the address holding counter and the read address holding register 41 and the cache operation in the write command using the address holding counter and the write address holding register 42 can be independently effected.

With this construction, in a case where a write command is issued while read commands are sequentially issued and then sequential read commands are issued again, it is only necessary to transfer read data without effecting the read operation with respect to the medium 9 if the read data which is already read into the buffer RAM 3 is present. Therefore, it is possible to execute the issued read command at high speed.

(Fifth Embodiment)

Figure 19:
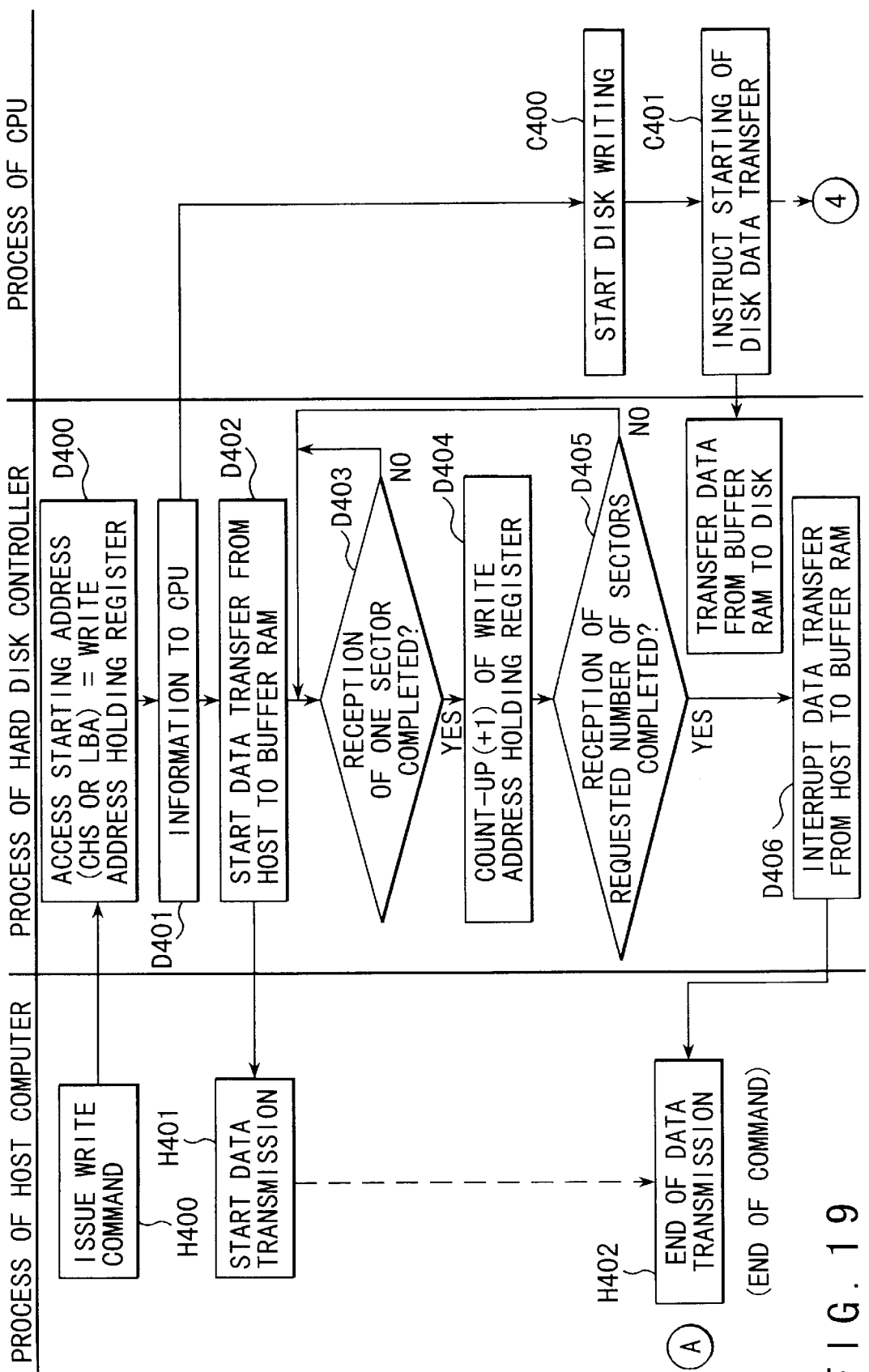
FIG. 19 is a flowchart for illustrating part of the operation of a fifth embodiment of the magnetic disk apparatus according to this invention.
Figure 20:
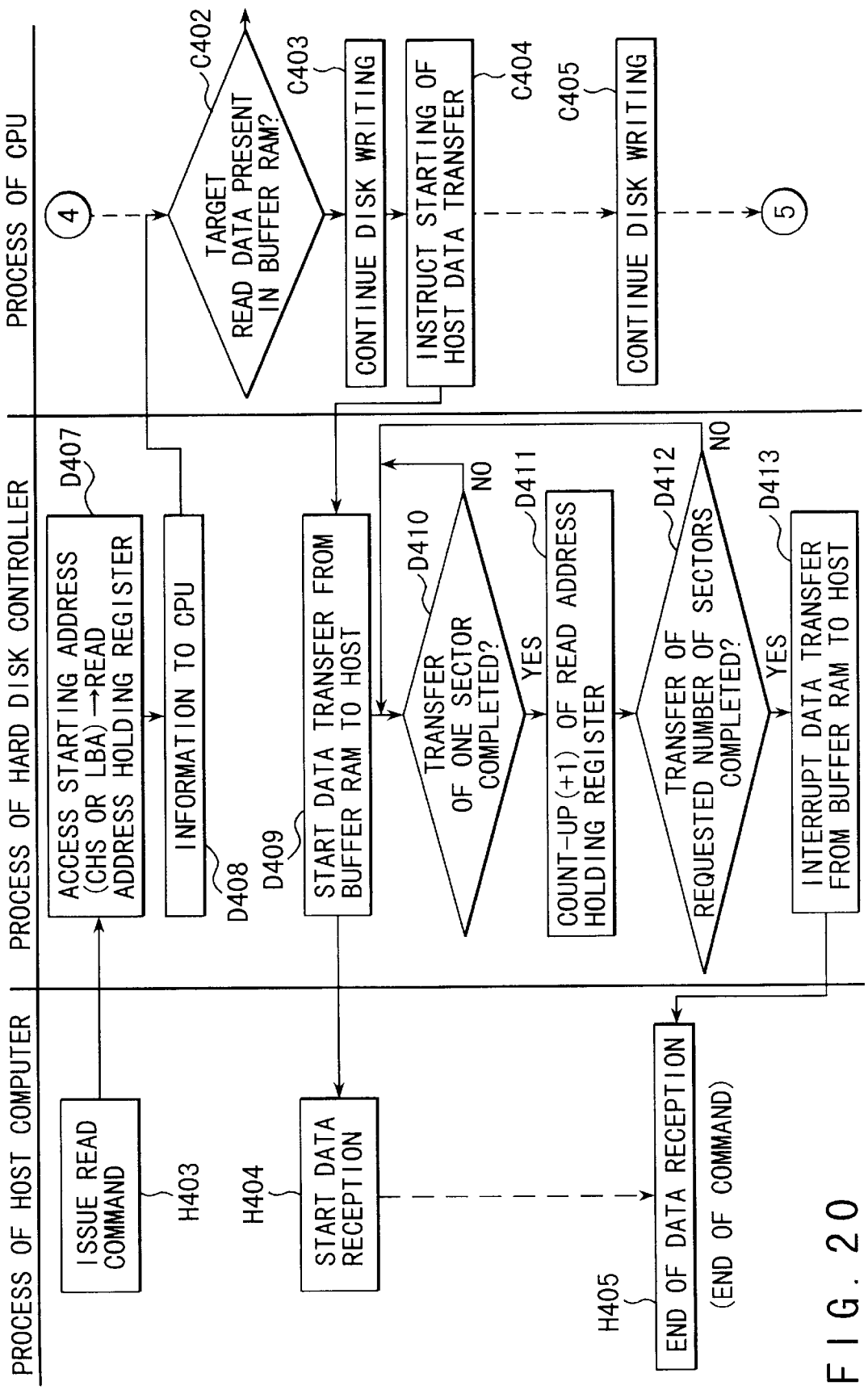
FIG. 20 is a flowchart for illustrating part of the operation of the fifth embodiment of the magnetic disk apparatus according to this invention.
Figure 21:
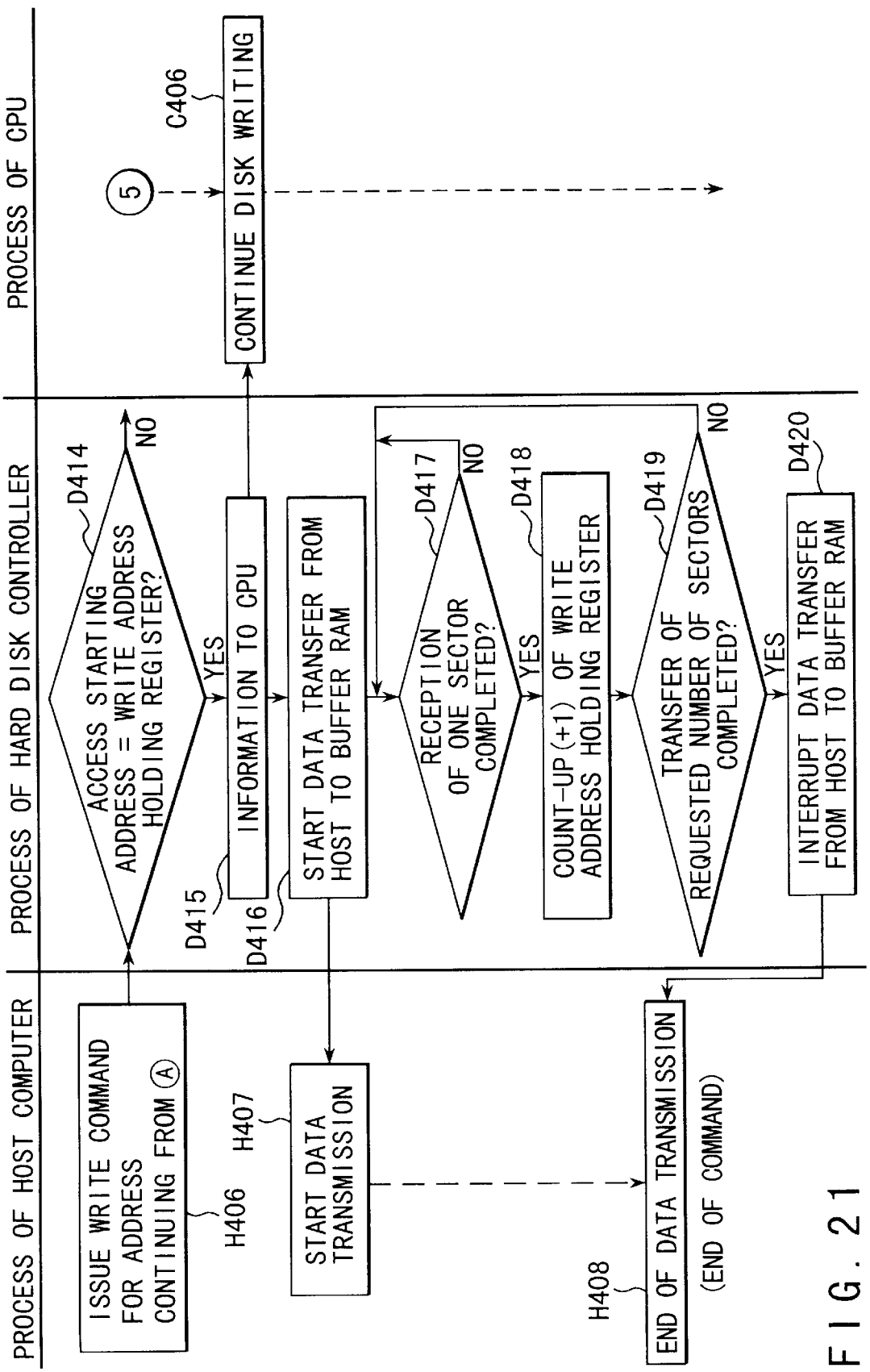
FIG. 21 is a flowchart for illustrating part of the operation of the fifth embodiment of the magnetic disk apparatus according to this invention.

FIGS. 19 to 21 are flowcharts for illustrating the operation of the fifth embodiment. That is, in the fifth embodiment, a write command is processed as shown in FIG. 19, then a read command is processed as shown in FIG. 30, and a write command for an address which continues from the access address of the preceding write command is processed as shown in FIG. 21, and the sequential write cache in the write command is effected. In the operation explained below, reference symbols in parentheses denote reference symbols of the steps.

First, if a write command is issued from the host system (H400), the HDC 4 stores an access starting address into the write address holding register 42 (D400) and informs the CPU 5 that the command has been issued (D401). At the same time, the HDC 4 starts to transfer write data from the host system to the buffer RAM 3 (D402). At the time of transfer, the value of the write address holding register 42 is incremented each time data of one sector is received (D404).

The CPU 5 instructs the HDC 4 to start the disk writing with respect to the medium 9 in response to the received information on issuance of the write command (C400) and start to transfer write data which has been transferred to the buffer RAM 3 to the buffer RAM 3 (C401). However, in this case, the operation of writing data into the medium 9 is not effected until a necessary amount of read data is transferred to the buffer RAM 3 from the host system. When a necessary amount of data has been received from the host system, the value of the write address holding register 42 indicates the address of a next area and the HDC 4 is set into the command receivable state (D406).

If a read command is issued as shown in FIG. 20 (H403), the HDC 4 stores an access starting address in the read address holding register 41 (D407) and informs the CPU 5 that the command has been issued (D408).

The CPU 5 determines whether or not target data is present in the buffer RAM 3 in response to reception of the above information (C402). In this case, the presence of the target data is determined. At this time, the disk writing is continuously effected (C403). Further, the CPU 5 instructs the HDC 4 to start the transfer of data read out from the medium 9 to the buffer RAM 3 (C404).

Then, the HDC 4 starts to transfer data to the host system (D409). At the time of data transfer, the value of the read address holding register 41 is incremented (increased) each time data of one sector is transferred (D411). When transfer of data of a requested number of sectors from the host system is completed (D413), the value of the read address holding register 41 indicates the address of a next area. At this time, the HDC 4 is set into the command receivable state. Even at this time, the disk writing is continued (C405).

If a next write command for sequential addresses is issued from the host system as shown in FIG. 21 (H406), the HDC 4 compares the content of the write address holding register 42 with the access starting address from the host system (D414). At this time, since the compared addresses coincide with each other, it informs the CPU 5 that the command has been received (D415) and starts the transfer of data from the host system (D416). Also, in this case, the value of the write address holding register 42 is incremented (D418) each time data of one sector is received at the time of transfer.

The HDC 4 continues the writing operation into the medium 9 which is started in the step C400 (C406).

According to the fifth embodiment, in a case where a read command is issued while write commands are sequentially issued and then sequential write commands are issued again, the cache operation in the read command using the read address holding register 41 and the cache operation in the write command using the write address holding register 42 can be independently effected since the HDC 4 includes the read address holding register 41 and the write address holding register 42.

That is, in this embodiment, whether desired read data is stored in the buffer RAM 3 or not can be determined by using the read address holding register 41 and the write address holding register 42. Therefore, if it is determined that desired read data is stored in the buffer RAM 3, transfer of the read data can be performed independently from the operation of writing data into the medium 9 and it is not required to interrupt the operation of writing data into the medium 9. As a result, the read command and write command can be executed at high speed.

According to the first to fifth embodiments, insufficiency of the cache function which may occur in a case where the address holding register is commonly used for the read command and write command and the read commands and write commands are alternately issued can be prevented. That is, since individual address holding registers are respectively provided for the read command and write command, there is no possibility that the content of the immediately preceding command address, that is, the content of the address holding register is erased at the time of switching of commands ("read" to "write" or "write" to "read"), and as a result, data having a possibility of cache hit cannot be used even if the data is present in the buffer RAM and a new access operation is required for the medium. Therefore, the cache function can be effectively performed and the time of data access to the medium can be reduced, thereby making it possible to reduce the command execution time.

This invention is not limited to the above embodiments and can be variously modified. For example, in the first and third to fifth embodiments, a case wherein the sequential cache is performed is explained, but this invention can be applied in a case where the sequential cache is not performed. For example, individual address holding registers are respectively provided for the read command and write command and the design is made to prevent the content of the preceding command address, that is, the content of the address holding register from being erased at the time of switching of commands ("read" to "write" or "write" to "read"). With this design, for example, in a case where a read command is issued immediately after the write command, whether or not the command address of the read command coincides with the command address of the write command can be determined. Therefore, write data in the buffer RAM can be immediately transferred to the host as read data with the write data kept unchanged. As a result, the read command can be executed at high speed.

As described above, according to this invention, a magnetic disk apparatus and a command processing method of the magnetic disk apparatus can be provided in which the cache function can be effectively performed and the read command or write command can be performed at high speed even in a case where the read commands and write commands are alternately issued.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic disk apparatus having a buffer for temporarily storing information transferred between a host system and a magnetic disk according to a read command or write command from the host system and performing a cache operation with respect to the host system by using the buffer without using a control program, comprising:

a read address holding register for holding an access starting address of a read command when the read command is received from the host system, a preset value being added to the content of said read address holding register each time data of a unit amount is transferred to the host system; and a write address holding register for holding an access starting address of a write command when the write command is received from the host system, a preset value being added to the content of said write address holding register each time data of a unit amount is received from the host system.

2. A magnetic disk apparatus according to claim 1, wherein an access address of the read command or write command is a cylinder head sector address or logical block address.

3. A magnetic disk apparatus having a buffer for temporarily storing information transferred between a host system and a magnetic disk according to a read command or write command from the host system and performing a cache operation with respect to the host system by using the buffer without using a control program, comprising:

an address holding counter for holding an access starting address of a read command or write command when the read command or write command from the host system is received, a preset value being added to the content of said address holding counter each time data of a unit amount is transferred with respect to the host system;

a read address holding register for holding the content of said address holding counter at the time of completion of the read command; and a write address holding register for holding the content of said address holding counter at the time of completion of the write command.

4. A magnetic disk apparatus according to claim 3, wherein an access address of the read command or write command is a cylinder head sector address or logical block address.

5. A magnetic disk apparatus having a buffer for temporarily storing information transferred between a host system and a magnetic disk according to a read command or write command from the host system and performing a cache operation with respect to the host system by using the buffer without using a control program, comprising:

an address holding counter for holding an access starting address of a read command or write command when the read command or write command is received from the host system, a preset value being added to the content of said address holding counter each time data of a unit amount is transferred with respect to the host system;

a read address holding register for holding the content of said address holding counter in a case where a preceding command is a read command and the present command is a write command; and a write address holding register for holding the content of said address holding counter in a case where the preceding command is a write command and the present command is a read command.

6. A magnetic disk apparatus according to claim 5, wherein an access address of the read command or write command is a cylinder head sector address or logical block address.

7. A command processing method of a magnetic disk apparatus for temporarily storing information transferred between a host system and a magnetic disk into a buffer according to a read command or write command from the host system and performing a cache operation with respect to the host system by using the buffer without using a control program, comprising:

an address holding step of holding an access starting address of a read command in a read address holding register when the read command is received from the host system and adding a preset value to the content of the read address holding register each time data of a unit amount is transferred to the host system; and a write address holding step of holding an access starting address of a write command in a write address holding register when the write command is received from the host system and adding a preset value to the content of the write address holding register each time data of a unit amount is received from the host system.

8. A command processing method according to claim 7, wherein an access address of the read command or write command is a cylinder head sector address or logical block address.

9. A command processing method of a magnetic disk apparatus for temporarily storing information transferred between a host system and a magnetic disk into a buffer according to a read command or write command from the host system and performing a cache operation with respect to the host system by using the buffer without using a control program, comprising:

an address holding step of holding an access starting address of a read command or write command in a address holding counter when the read command or write command is received from the host system and adding a preset value to the content of the address holding counter each time data of a unit amount is transferred with respect to the host system;

a read address holding step of holding the content of the address holding counter in a read address holding register at the time of completion of the read command; and a write address holding step of holding the content of the address holding counter in a write address holding register at the time of completion of the write command.

10. A command processing method according to claim 9, wherein an access address of the read command or write command is a cylinder head sector address or logical block address.

11. A command processing method of a magnetic disk apparatus for temporarily storing information transferred between a host system and a magnetic disk into a buffer according to a read command or write command from the host system and performing a cache operation with respect to the host system by using the buffer without using a control program, comprising:

an address holding step of holding an access starting address of a read command or write command in a address holding counter when the read command or write command is received from the host system and adding a preset value to the content of the address holding counter each time data of a unit amount is transferred with respect to the host system;

a read address holding step of holding the content of the address holding counter in a read address holding register in a case where a preceding command is a read command and the present command is a write command; and a write address holding step of holding the content of the address holding counter in a write address holding register in a case where the preceding command is a write command and the present command is a read command.

12. A command processing method according to claim 11, wherein an access address of the read command or write command is a cylinder head sector address or logical block address.

13. A hard disk controller (HDC) controlling a buffer for temporarily storing information transferred between a host system and a magnetic disk according to a read command or write command from the host system and performing a cache operation with respect to the host system by using the buffer without using a control program, comprising:

a read address holding register for holding an access starting address of a read command when the read command is received from the host system, a preset value being added to the content of said read address holding register each time data of a unit amount is transferred to the host system; and a write address holding register for holding an access starting address of a write command when the write command is received from the host system, a preset value being added to the content of said write address holding register each time data of a unit amount is received from the host system.

14. A hard disk controller (HDC) controlling a buffer for temporarily storing information transferred between a host system and a magnetic disk according to a read command or a write command from the host system and performing a cache operation with respect to the host system by using the buffer without using a control program, comprising:

an address holding counter for holding an access starting address of a read command or write command when the read command or write command from the host system is received, a preset value being added to the content of said address holding counter each time data of a unit amount is transferred with respect to the host system;

a read address holding register for holding the content of said address holding counter at the time of completion of the read command; and a write address holding register for holding the content of said address holding counter at the time of completion of the write command.

15. A hard disk controller (HDC) controlling a buffer for temporarily storing information transferred between a host system and a magnetic disk according to a read command or write command from the host system and performing a cache operation with respect to the host system by using the buffer without using a control program, comprising:

an address holding counter for holding an access starting address of a read command or write command when the read command or write command is received from the host system, a preset value being added to the content of said address holding counter each time data of a unit amount is transferred with respect to the host system;

a read address holding register for holding the content of said address holding counter in a case where a preceding command is a read command and the present command is a write command; and a write address holding register for holding the content of said address holding counter in a case where the preceding command is a write command and the present command is a read command.

\* \* \* \* \*